(12) United States Patent
Yui

(10) Patent No.: US 7,051,941 B2
(45) Date of Patent: May 30, 2006

(54) IMAGE READING UNIT AND IMAGE READING APPARATUS

(75) Inventor: Kenichi Yui, Kofu (JP)

(73) Assignee: Nisca Corporation, Yamanashi-Ken (JP)

( * ) Notice: Subject to any disclaimer, the term of this patent is extended or adjusted under 35 U.S.C. 154(b) by 212 days.

(21) Appl. No.: 10/790,065

(22) Filed: Mar. 2, 2004

(65) Prior Publication Data

US 2004/0178268 A1    Sep. 16, 2004

(30) Foreign Application Priority Data

Mar. 3, 2003    (JP)    .............................. 2003-055117
Mar. 3, 2003    (JP)    .............................. 2003-055152

(51) Int. Cl.
*G06K 7/10*    (2006.01)

(52) U.S. Cl. .............................. 235/462.43; 235/462.44

(58) Field of Classification Search ....... 235/462.4–44; 355/85, 116, 118, 120, 128, 129, 131
See application file for complete search history.

(56) References Cited

U.S. PATENT DOCUMENTS 3,940,211 A * 2/1976 Johannsmeier ............... 355/53
4,040,736 A * 8/1977 Johannsmeier ............... 355/43
4,473,291 A * 9/1984 Wally, Jr. ..................... 355/18
5,663,558 A * 9/1997 Sakai ........................... 250/234
6,866,721 B1 * 3/2005 Lim et al. ..................... 118/722

OTHER PUBLICATIONS

Patent Abstracts of Japan; Publication No. 05-030293, Publication Date: Feb. 5, 1993; Applicant: Canon Inc.
Patent Abstracts of Japan; Publication No. 2001-238012, Publication Date: Aug. 31, 2001; Applicant: Murata mach Ltd.

* cited by examiner

*Primary Examiner*—Thien M. Le
*Assistant Examiner*—Kimberly D. Nguyen
(74) *Attorney, Agent, or Firm*—Manabu Kanesaka

(57) ABSTRACT

An image reading apparatus includes a scanning unit disposed in a box-shaped casing for scanning a stationary original in a sub-scanning direction to read the original; a supporting unit for supporting one side of the scanning unit in a main scanning direction and guiding the one side of the scanning unit in the sub-scanning direction; a driving source for moving the scanning unit in the sub-scanning direction; a drive transmitting unit for transmitting a drive of the driving source to the scanning unit; and first and second reinforcing plates attached to the casing along the sub-scanning direction for reinforcing the casing. The first reinforcing plate forms a guide unit for supporting the other side of the scanning unit in the main scanning direction and guiding the scanning unit in the sub-scanning direction. The driving source and the drive transmitting unit are fixed to the second reinforcing unit.

20 Claims, 13 Drawing Sheets

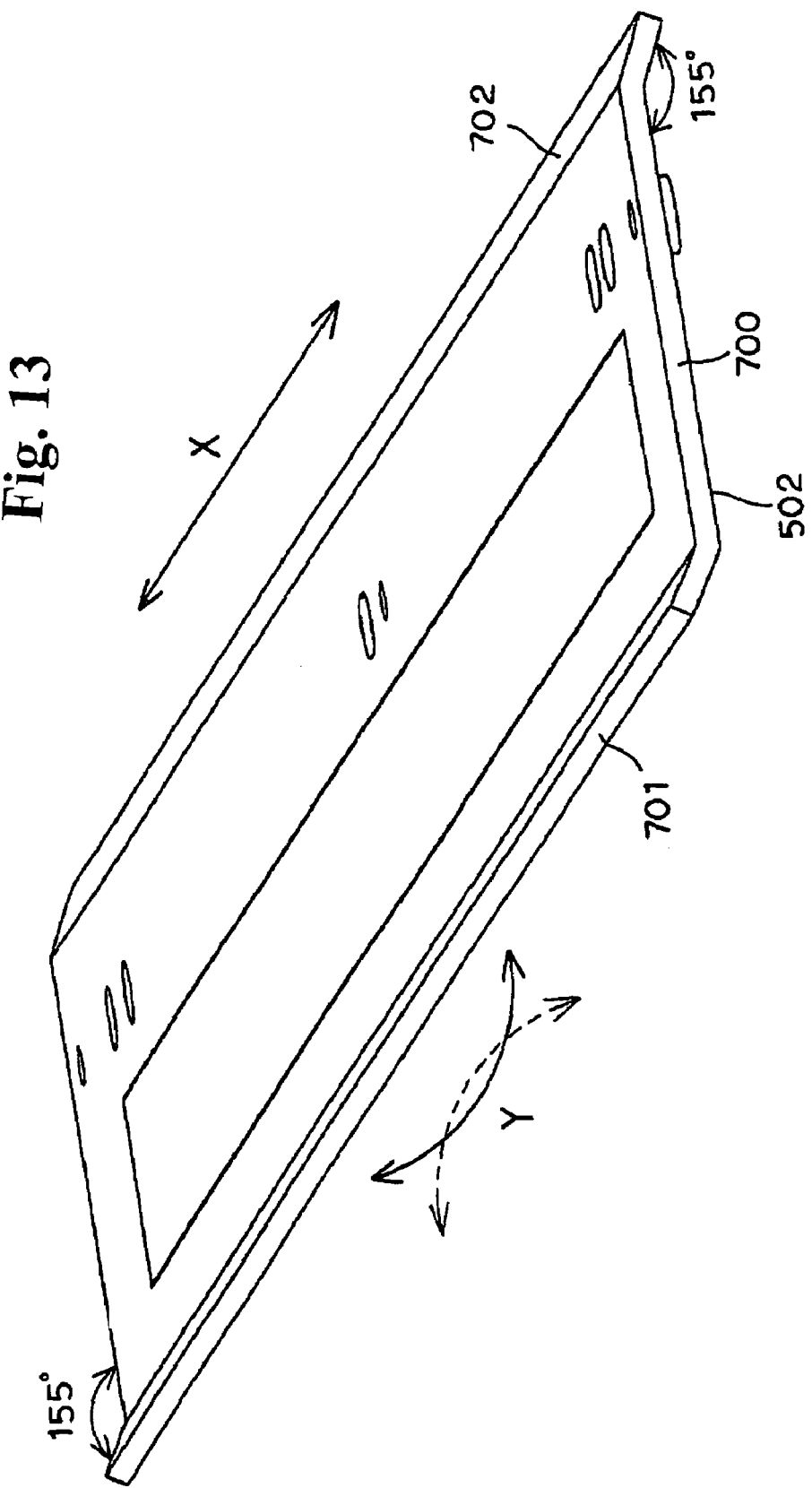

form a driving unit. That is, the driving source and the drive transmitting unit are attached to the casing together with the second reinforcing plate. Accordingly, the number of parts is reduced, and assembly efficiency is improved. The driving source is fixed to the second reinforcing plate separately
IMAGE READING UNIT AND IMAGE READING APPARATUS

BACKGROUND OF THE INVENTION AND RELATED ART STATEMENT

The present invention relates to an image reading unit and an image reading apparatus used as a scanner and the like installed in a facsimile device, an image forming apparatus, and a computer.

An image reading apparatus includes an image reading unit having an image sensor such as a CCD mounted in a box shaped casing. The image reading unit is moved in a sub-scanning direction to read an original mounted on a platen fixed to a casing. In the casing, there are provided a driving source such as a motor for driving the image reading unit, a timing belt for transmitting a drive from the driving source to the image reading unit, and a driving system such as a pair of pulleys on which the timing belt is extended.

In recent years, in order to reduce a weight of the apparatus and the number of parts, the casing has been integrally formed with the apparatus. Accordingly, there may be a case that the casing does not have enough rigidity, thereby making it difficult to perform a reading scanning operation precisely. Further, since the casing expands or contracts due to a temperature change and a distance between the pulleys changes, the timing belt is tensioned with various forces and may skip teeth of the pulleys. Accordingly, it is difficult to perform a precise scanning operation to obtain an image with good quality.

Japanese Patent Publication (Kokai) No. 2001-238012 has disclosed an image reading apparatus in which four reinforcing plates, i.e. two reinforcing plates extending along a sub-scanning direction and two reinforcing plates extending along a main scanning direction, are attached to an upper surface of a box shape casing for reinforcing the casing formed of a resin. In the image reading apparatus, one of the reinforcing plates extending along the sub-scanning direction is used also as a guide member for guiding an image reading unit, thereby reducing the number of parts and improving assembly efficiency.

In the technique disclosed in Japanese Patent Publication (Kokai) No. 2001-238012, after components of a driving system are individually fixed to the casing with screws, a distance between pulleys is adjusted, thereby deteriorating the assembly efficiency and productivity. Further, it is difficult to improve scanning accuracy of the image reading unit against a temperature change.

In the image reading apparatus described above, the image reading unit includes a frame made of a resin; a light source attached to the frame for irradiating an original; a reflection unit having a plurality of mirrors for reflecting the light reflected from the original; a lens unit for forming an image of the reflected light from the original through the reflection unit; and an image sensor disposed at a position where the lens unit forms the image and having a plurality of photoelectric transfer elements such as CCDs (Charge Coupled Devices) arranged in a line. After the reflected light (image light) from the original is reflected through the reflection unit, the lens unit forms the image on the image sensor. The formed image is converted into an electric signal, and the electric signal is converted into a digital signal to be output.

In general, a frame of an image reading unit is formed of a resin to reduce a weight and cost. Japanese Patent Publication (Kokai) No. 05-30292 has disclosed a configuration in which a frame is provided with openings in sidewalls thereof for attaching mirrors, and the mirrors are directly attached to the frame with fixing fittings pressing ends of the mirrors against the openings.

In the technique disclosed in Japanese Patent Publication (Kokai) No. 05-30292, the frame thermally expands or lowers strength due to heat of a light source, so that the mirrors are shifted from the attached positions, thereby making it difficult to obtain a good image.

To solve such a problem, a pair of metal plates may be attached to sidewalls of a frame made of a resin, and mirrors are fixed to the plates. Accordingly, because of a low coefficient of thermal expansion and a high strength of the metal, it is possible to reduce a shift of the mirrors from attached positions, thereby obtaining a good image and reducing a weight and cost.

In the case that the mirrors are fixed to the metal plates, the plates are disposed inside the frame. Accordingly, light is irregularly reflected at the plates and incidents on an image sensor, thereby giving an adverse effect on the image. Further, the plates are disposed within a substantially sealed frame. Therefore, when a light source is continuously powered on for a long time in a continuous reading operation, the heat is confined in the frame, so that the plates are undesirably heated up to change the positions of the mirrors, thereby giving an adverse effect on an image.

In view of the problems described above, a first object of the present invention is to provide an image reading apparatus with excellent assembly efficiency capable of performing an accurate scanning operation irrespective of an environmental temperature change and having a casing made of a resin to reduce a weight.

A second object of the present invention is to provide an image reading unit having a frame made of a resin to reduce the weight of the unit, in which change in a position of a mirror is suppressed to a minimum level irrespective of an environmental temperature change to obtain a good image, and an image reading apparatus using the image reading unit.

Further objects and advantages of the invention will be apparent from the following description of the invention.

SUMMARY OF THE INVENTION

In order to achieve the first object described above, according to the present invention, an image reading apparatus comprises a scanning unit disposed in a box-shaped casing for scanning in a sub-scanning direction to read a stationary original; a supporting unit for supporting one side of the scanning unit in a main scanning direction and guiding the scanning unit in the sub-scanning direction; a driving source for moving the scanning unit in the sub-scanning direction; a drive transmitting unit for transmitting a drive of the driving source to the scanning unit; and first and second reinforcing plates attached to the casing along the sub-scanning direction for reinforcing the casing. The first reinforcing plate forms a guide unit for supporting the other side of the scanning unit in the main scanning direction and guiding the scanning unit in the sub-scanning direction. The driving source and the drive transmitting unit are fixed to the second reinforcing unit.

In the present invention, the driving source and the drive transmitting unit are fixed to the second reinforcing plate to form a driving unit. That is, the driving source and the drive transmitting unit are attached to the casing together with the second reinforcing plate. Accordingly, the number of parts is reduced, and assembly efficiency is improved. The driving source is fixed to the second reinforcing plate separately from the supporting unit for supporting the scanning unit and the first reinforcing plate. Accordingly, it is possible to reduce vibration of the driving source transferred to the scanning unit, so that the image reading apparatus can perform an accurate scanning operation.

According to the present invention, the drive transmitting unit may engage the scanning unit, and include an endless belt for transmitting the drive of the driving source to the scanning unit; a pair of pulleys on which the endless belt is extended; and an adjusting unit for adjusting a distance between the pair of pulleys. Accordingly, it is possible to adjust the adjusting unit before the driving unit is attached to the casing, thereby improving the assembly efficiency.

According to the present invention, the casing may be made of a resin material and the first and second reinforcing plates may be made of a metallic material. Accordingly, it is possible to reduce a change in a length of the casing due to a temperature change with the first and second reinforcing plates, and to reduce a change in the distance between the pair of pulleys, thereby moving the scanning unit stably.

According to the present invention, the first and second reinforcing plates may be disposed on an inner bottom surface of the casing. Accordingly, the scanning unit, the driving source and the drive transmitting unit can be disposed on the inner bottom surface of the casing in a stable state through the first and second reinforcing plates. Further, the casing has first and second case sidewalls spaced apart in the sub-scanning direction. The supporting unit may be formed in a rod-shape and disposed in the vicinity of the second reinforcing plate along the sub-scanning direction. The supporting unit may be fixed to the first and second case sidewalls at end portions thereof. Accordingly, the second reinforcing plate is disposed near the supporting unit for reinforcing a part of the casing near the supporting unit, so that it is possible to maintain linearity of the supporting unit, thereby obtaining accurate reading and scanning operations.

According to the present invention, the second reinforcing plate may be provided with a fan for cooling the casing and a light source driving unit for driving a light source for irradiating the original. Accordingly, it is possible to further unitize the apparatus, thereby improving the assembly efficiency. At this time, the fan and the light source driving unit may be fixed to the second reinforcing plate outside a scanning area of the scanning unit, so that the scanning unit, the fan, and the light source driving unit are not overlapped vertically, thereby reducing a thickness of the image reading apparatus. Further, the driving source, the fan, and the light source driving unit may be arranged in parallel along the sub-scanning direction. That is, the fan is disposed at one side in the sub-scanning direction, the driving source is disposed at the other side, and the light source driving unit is disposed between the fan and the driving source. Accordingly, the light source driving unit is disposed at a substantially middle section of the casing near the scanning unit, thereby shortening a wiring between the light source driving unit and the scanning unit.

According to the present invention, the first reinforcing plate may have a slide surface on which the scanning unit slides, and the slide surface may have a curved surface curved relative to the slide surface at one of end portions thereof along the sub-scanning direction for reinforcing the first reinforcing plate. Accordingly, it is possible to reduce deformation of the casing relative to a vertical force. Further, the second reinforcing plate may have a bottom surface along the inner bottom surface of the casing and a curved surface curved relative to the bottom surface for reinforcing the second reinforcing plate. Accordingly, it is possible to reduce deformation of the casing relative to a vertical force. The second reinforcing plate may have a support part with a U-shape section along the sub-scanning direction for reinforcing the second reinforcing plate. Accordingly, it is possible to further reduce deformation of the casing relative to a vertical force. Further, the support part may support at least one of the pair of pulleys, thereby eliminating a member for supporting the pulleys and reducing the number of parts.

In order to achieve the second object described above, according to the present invention, an image reading unit comprises a light source for irradiating an original; a frame having a pair of sidewalls spaced apart and opposed to each other in a longitudinal direction of the light source for supporting the light source; a reflecting unit disposed along the longitudinal direction of the light source for reflecting the light reflected from the original; an image forming unit for forming an image of the reflected light from the reflecting unit; a photoelectric transfer unit for converting the light of the image formed by the image forming unit into an electric signal; a pair of support plates disposed outside the pair of the sidewalls of the frame for supporting the reflecting unit; and a fixing unit for fixing end portions of the reflecting unit to the pair of the support plates.

In the present invention, the support plates are disposed outside the pair of the sidewalls of the frame for supporting the reflecting unit. Accordingly, it is possible to reduce irregular reflection of the light at the support plates. Since heat is hardly confined outside the frame, it is possible to reduce thermal expansion of the support plates and a shift of the reflecting unit due to a rise of temperature, thereby obtaining a good image.

According to the present invention, the frame may be formed of a resin and the support plates may be formed made of metal. Accordingly, it is possible to reduce a weight of the image reading unit due to the resin frame, and to reduce a shift of the reflecting unit due to a low coefficient of thermal expansion and high strength of the metal support plates, thereby obtaining a good image. In this case, openings are formed in the pair of the sidewalls of the frame for retaining the reflecting unit, so that the support plates disposed outside the sidewalls support the reflecting unit passing through the openings.

According to the present invention, the support plates may support the reflecting unit inside the openings. Accordingly, the support plates directly support the reflecting unit, so that it is possible to reduce the change of the position of the reflecting unit due to deformation of the frame. One of the pair of the support plates may be provided with at least a pair of protrusions for abutting against the reflecting unit, and the other of the support plates may be provided with at least one protrusion for abutting against the reflecting unit. That is, the support plates support the reflecting unit at three points. Accordingly, it is possible to reduce a torsion stress exerted on the reflecting unit due to dimension accuracy of the support plates, thereby supporting the reflecting unit easily.

According to the present invention, the pair of the support plates may be fixed to the pair of the sidewalls of the frame through protrusions protruding on outer surfaces of the pair of the sidewalls of the frame, so that clearances corresponding to a height of the protrusions are formed between the support plates and the sidewalls. Accordingly, the support plates contact the sidewalls of the frame at small areas, thereby reducing heat transmitted from the frame to the support plates and decreasing a temperature of the support plates. Further, the reflecting unit may include a final reflection mirror disposed in the vicinity of a lower part of the light source for guiding the reflected light from the original to the image forming unit. A fixing unit formed of a resin may fix the final reflection mirror to the pair of the support plates, and an urging unit formed of a resin may urge the final reflection mirror. Accordingly, it is possible to eliminate a discharge between the urging unit for urging the final reflection mirror and an electrode of the light source.

According to the present invention, an image reading apparatus may include the image reading unit described above, a casing for accommodating the image reading unit therein, and a fan disposed in the casing for cooling an inner part of the casing, thereby decreasing a temperature of the support plates.

According to the present invention, the image reading apparatus may include an original transport unit for transporting an original to a predetermined reading position, the image reading unit arranged at the predetermined reading position for reading the original transported by the original transporting unit, and the fan arranged at a position for blowing air to the support plates of the image reading unit. When the original transporting unit continuously transports the originals, the light source irradiates the originals for a long period of time and a temperature of the support plates rises. In this case, the fan cools the support plates and the reflecting unit is not shifted, thereby obtaining a good image.

BRIEF DESCRIPTION OF THE DRAWINGS

FIGS. 5(a) and 5(b) are views showing first and second support plates and mirrors in the image reading unit, wherein FIG. 5(a) is a side view of the first support plate and FIG. 5(b) is a side view of the second support plate;

FIG. 13 is a perspective view of a first reinforcing plate of the image reading apparatus.

DETAILED DESCRIPTION OF PREFERRED EMBODIMENTS

Figure 1:
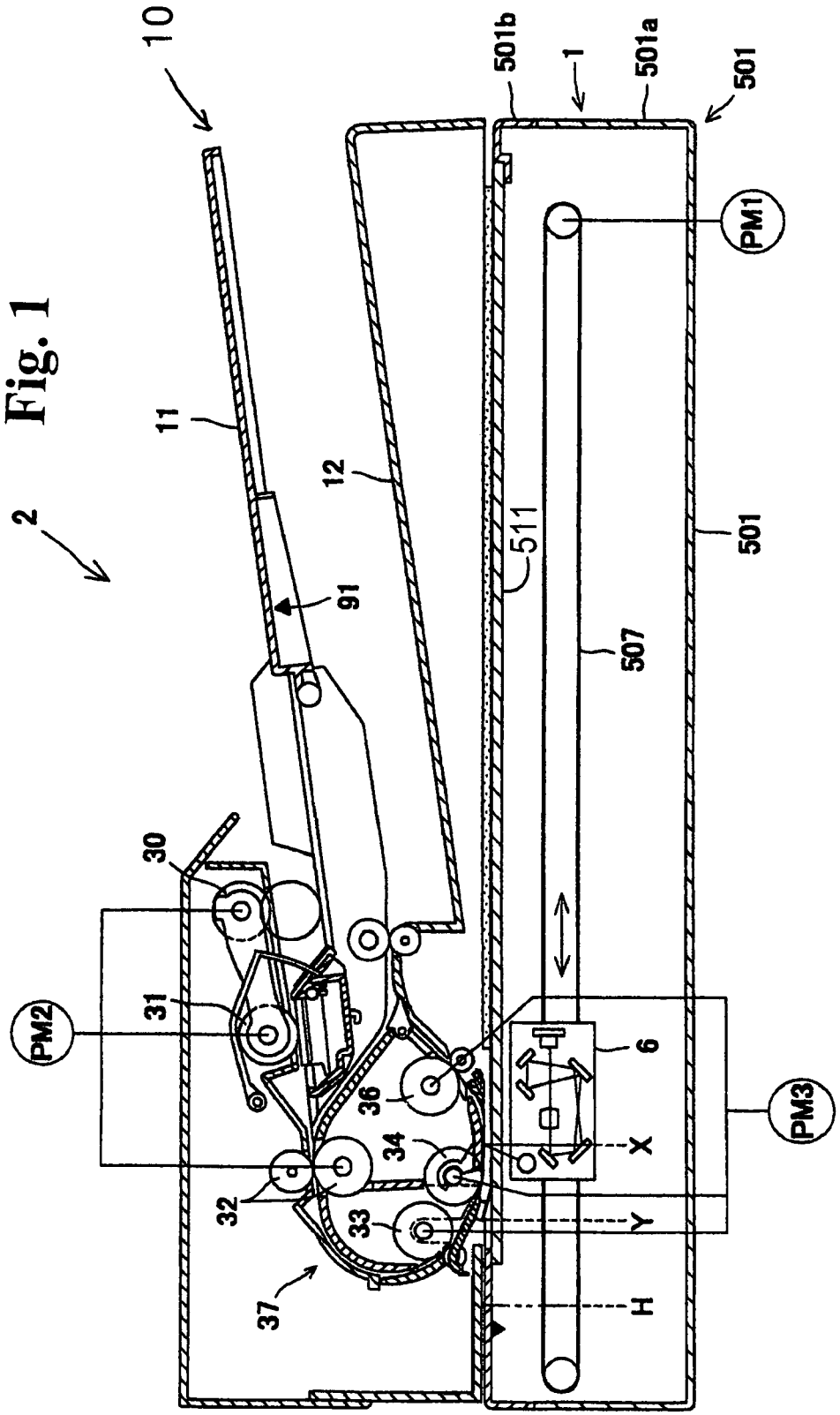
FIG. 1 is a sectional view of an image reading apparatus according to an embodiment of the present invention.

Hereunder, embodiments of the present invention will be described with reference to the accompanying drawings. As shown in FIG. 1, an image reading apparatus 10 includes an image reading part 1 for reading an image of an original, and an automatic original transporting part 2 disposed above the image reading part 1 for transporting the original one by one to a predetermined position where the image reading part 1 reads the original.

The image reading part 1 has a box-shaped casing 501 formed of a synthetic resin, i.e. an alloy of acrylic butadiene styrene (ABS) and polycarbonate (PC) having a coefficient of linear thermal expansion of about $80 \times 10^{-5}$ (/° C.). The casing 501 includes a box-shaped lower casing 501a as a bottom of the casing 501 having an opening in an upper surface thereof and a cover-shaped upper casing 501b disposed above the lower casing 501a. The lower casing 501a has first and second case sidewalls 550a and 550b (see FIG. 2) spaced apart in a longitudinal direction (hereinafter referred to as a sub-scanning direction) of the casing 501. A platen 511 made of a transparent glass plate is attached to an upper surface of the upper casing 501b, and arranged substantially horizontally. An original is placed on the platen 511. In the casing 501, there are disposed an image reading unit 6 (arranged at a home position H (see FIG. 1) of the first case sidewall 550a side illustrated in FIG. 2) supported to be movable in the sub-scanning direction for reading an image on the original and a driving unit 520 arranged along the sub-scanning direction for driving the image reading unit 6.

Figure 2:
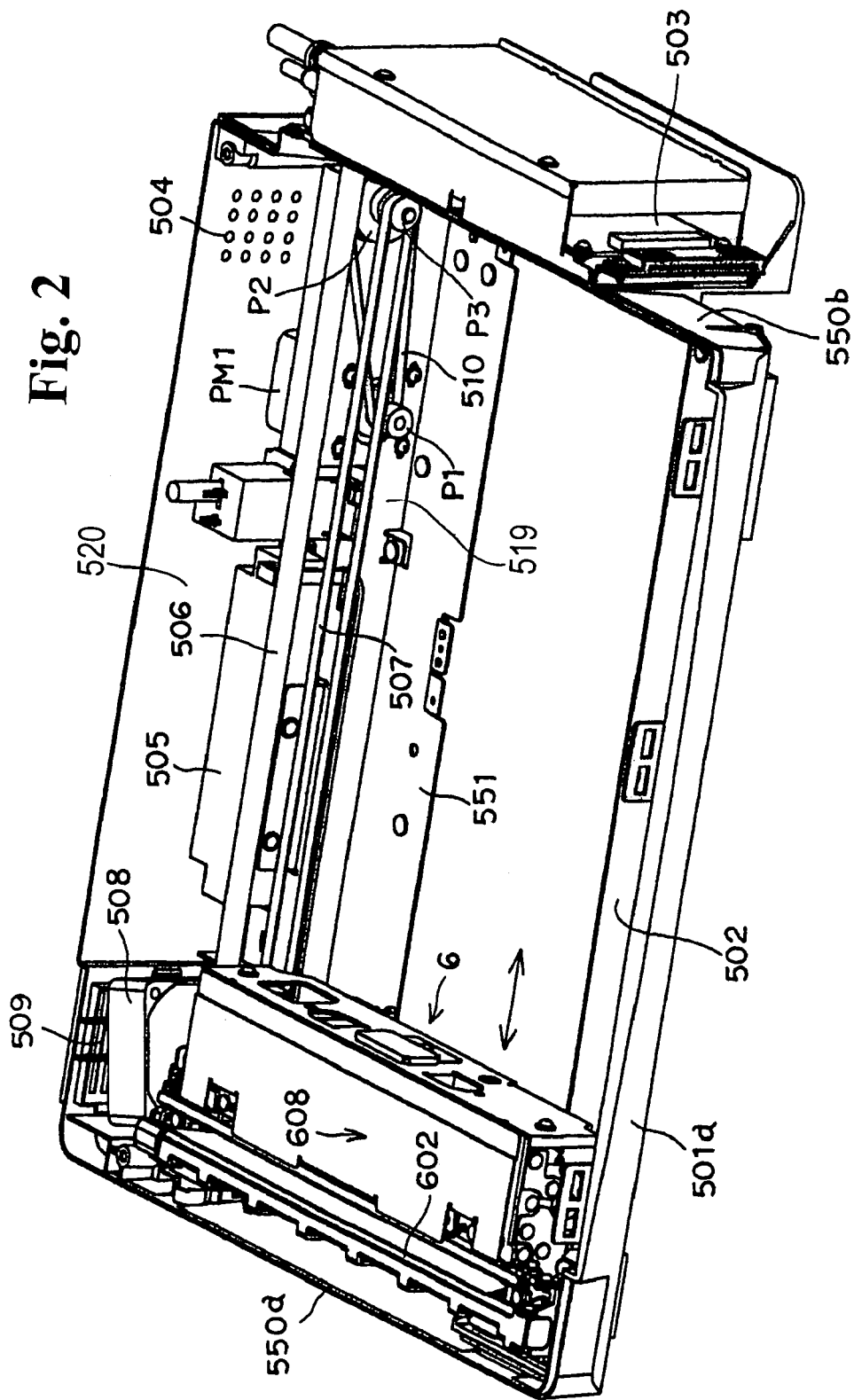
FIG. 2 is a perspective view of an inner part of the image reading apparatus according to the embodiment.

As shown in FIG. 2, the driving unit 520 is attached to an inner bottom surface of the lower casing 501a at one side (interior side in FIG. 2) of the image reading unit 6 in the longitudinal direction (hereinafter referred to as a main scanning direction). A rod shaped metallic shaft 506 is arranged above the driving unit 520 along the sub-scanning direction for supporting one side of the image reading unit 6 in the main scanning direction and guiding it in the sub-scanning direction. End parts of the shaft 506 are respectively fixed to the first and second sidewalls 550a and 550b. Further, on the inner bottom surface of the lower casing 501a at the other side in the main scanning direction (front side of FIG. 2), a metallic first reinforcing plate 502 is attached along the sub-scanning direction for reinforcing the lower casing 501a, supporting the image reading unit 6 and guiding the image reading unit to the sub-scanning direction.

As a material forming the first reinforcing plate 502, ordinary steel or a low steel alloy and the like having a coefficient of linear thermal expansion of about $11 \times 10^{-6}$ (/° C.) may be employed. On the bottom surface of the image reading unit 6 at the other side in the main scanning direction, a slide member made of a lubricating resin is attached to slide in contact with the upper surface of the first reinforcing plate 502. The image reading unit 6 slides on the first reinforcing plate 502 through the slide member. On the sidewall of the lower casing 501a in the driving unit 520 side along the sub-scanning direction, an inlet port 509 for taking in air to the casing 501 and an exhaust port 504 for exhausting air are formed. The inlet port 509 is disposed at the home position side of the image reading unit 6 and in the vicinity of a reading position for reading the original transported by an ADF. The exhaust port 504 is disposed at a position opposite to the inlet port 509. Both the inlet port 509 and the exhaust port 504 are formed with a plurality of openings.

A control part having a control panel 503 accommodated therein is disposed adjacent to the second case sidewall 550b. Air in the casing 501 flows from the sidewall 550a to the sidewall 550b (from left to right in the drawing).

Figure 3:
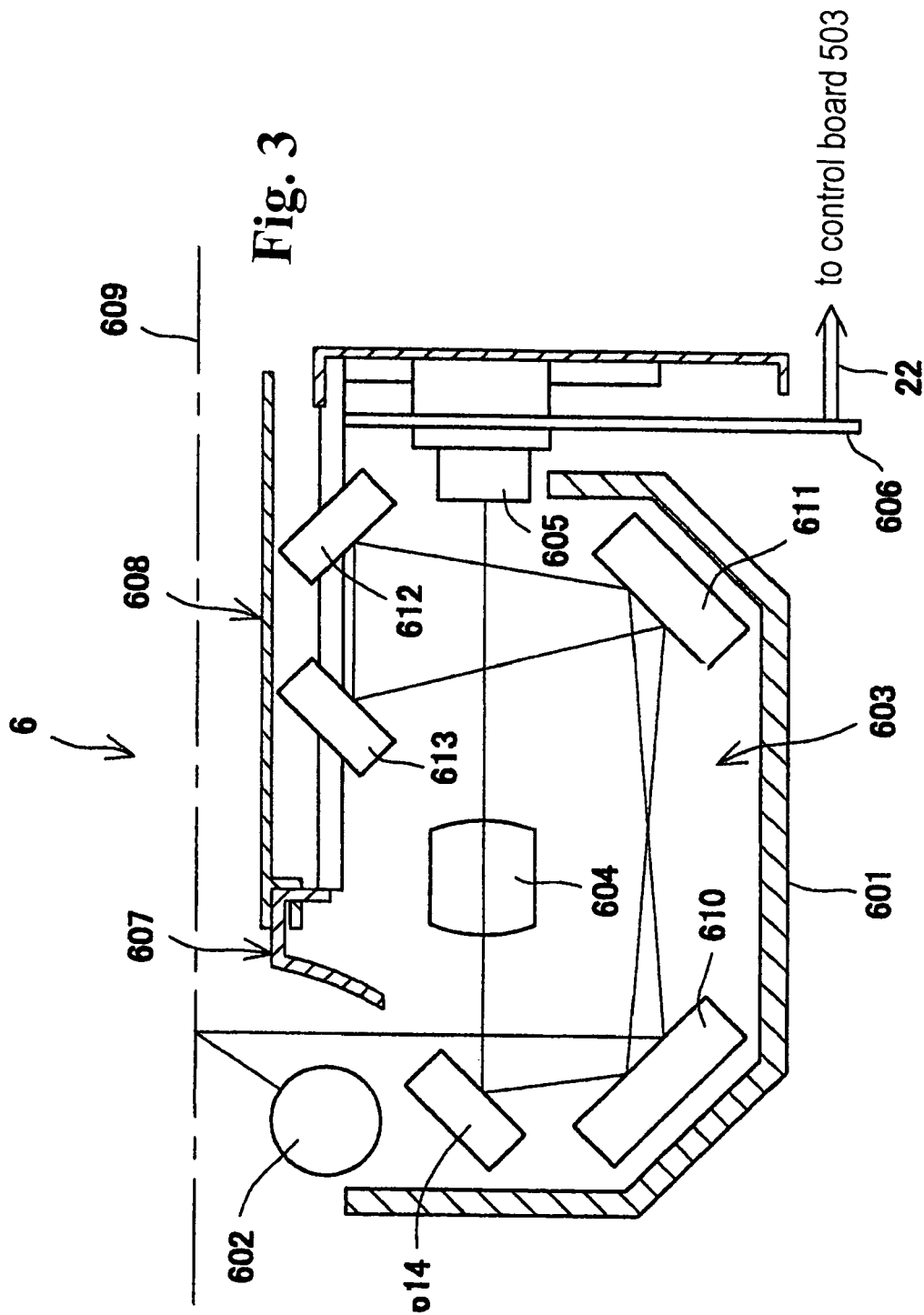
FIG. 3 is a sectional view of an image reading unit of the image reading apparatus according to the embodiment.

As shown in FIG. 3, the image reading unit 6 has a xenon lamp 602 with a rod shape extending in the sub-scanning direction and a substantially circular section for irradiating the original 609. The image reading unit 6 has also a box-shaped frame 601 formed of a synthetic resin for supporting the xenon lamp 602. The frame 601 has an opening formed in an upper part thereof and a pair of sidewalls spaced apart in the main scanning direction (first and second sidewalls 60a and 60b shown in FIG. 4).

Further, the image reading unit 6 has a reflection mirror unit 603 disposed at a predetermined position along the longitudinal direction of the xenon lamp 602 in the frame 601. The image reading unit 6 includes a lens unit 604 disposed at a substantially central position of the frame 601 for forming the image of light reflected from the reflection mirror unit 603 and an image sensor 605 disposed at the substantially same horizontal position as that of the lens unit 604 for converting the light of the image formed in the lens unit 604 to an electric signal (analog signal). In the image sensor 605, many photoelectric transfer elements such as CCDs are arranged in a line.

Figure 4:
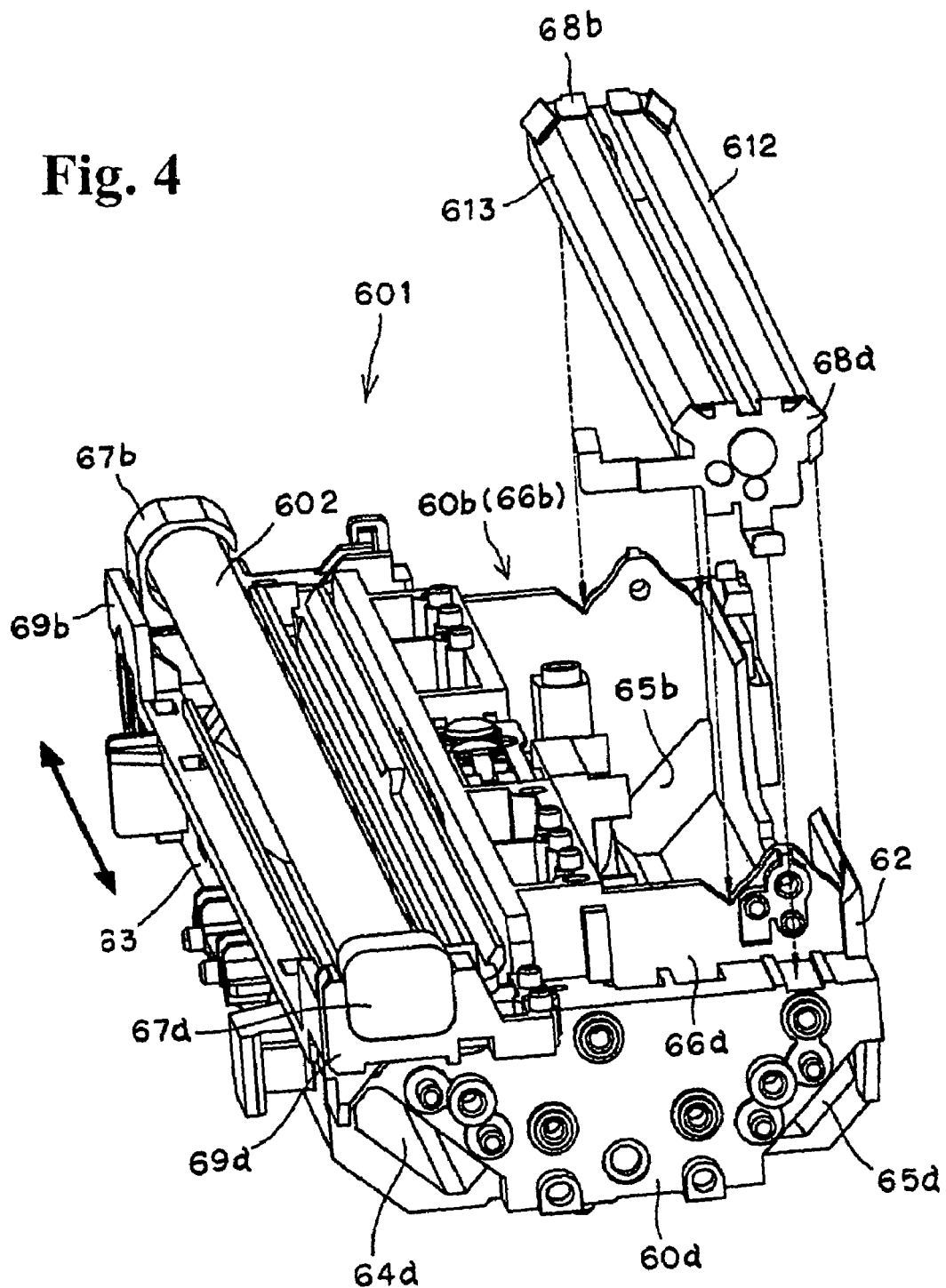
FIG. 4 is a perspective view of a frame of the image reading unit of the image reading apparatus.
Figure 5A:
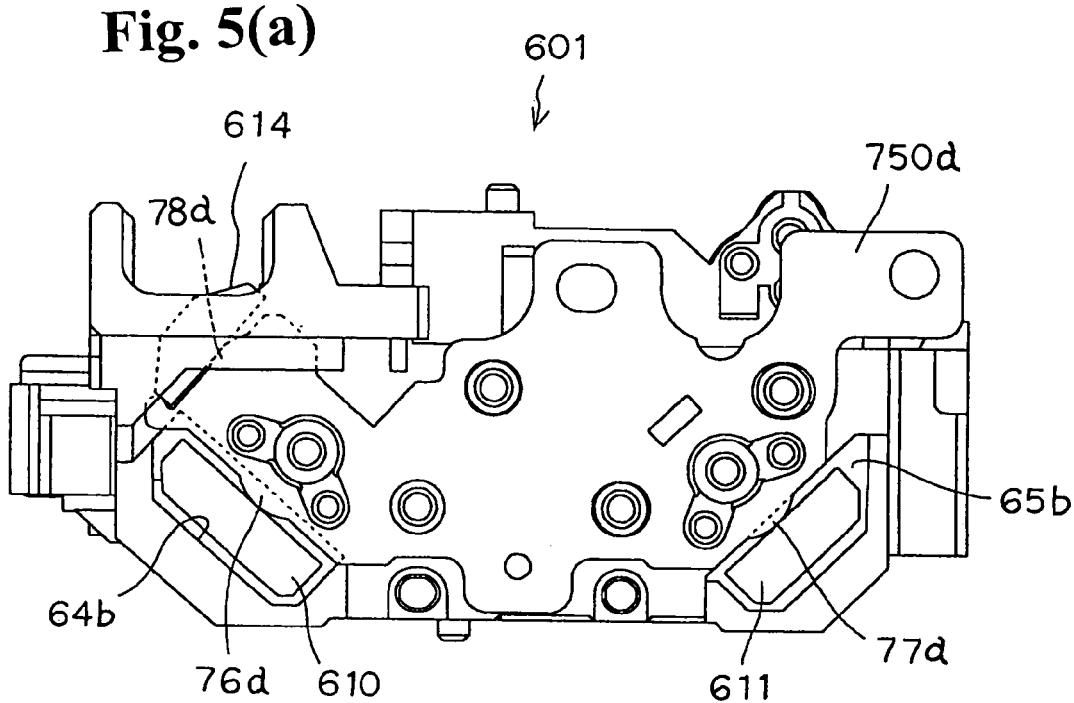
Figure 5B:
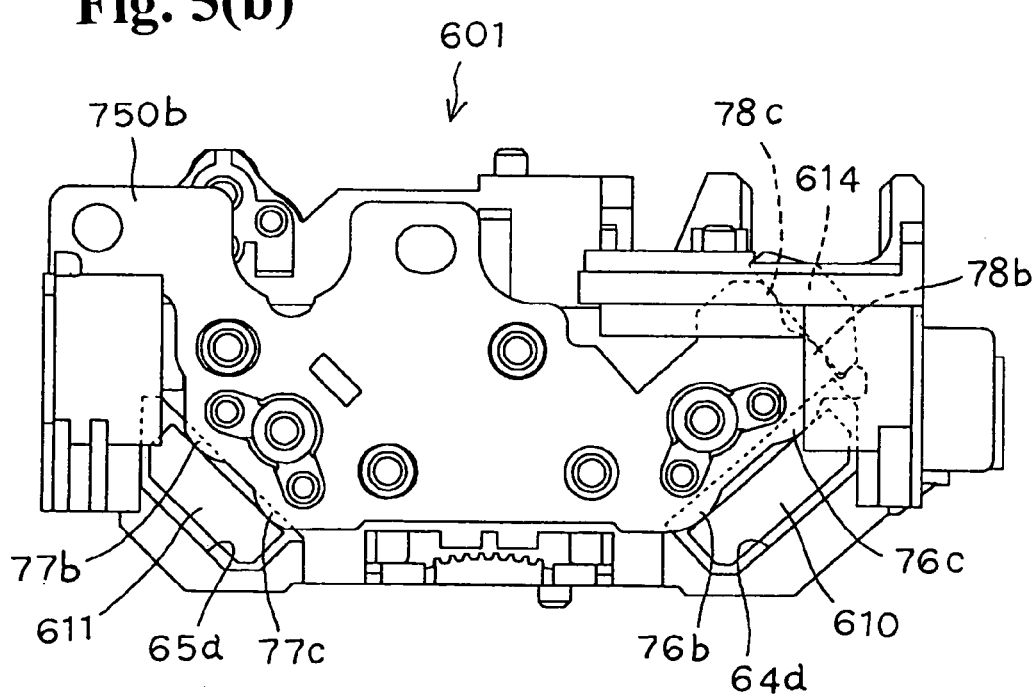
Figure 6:
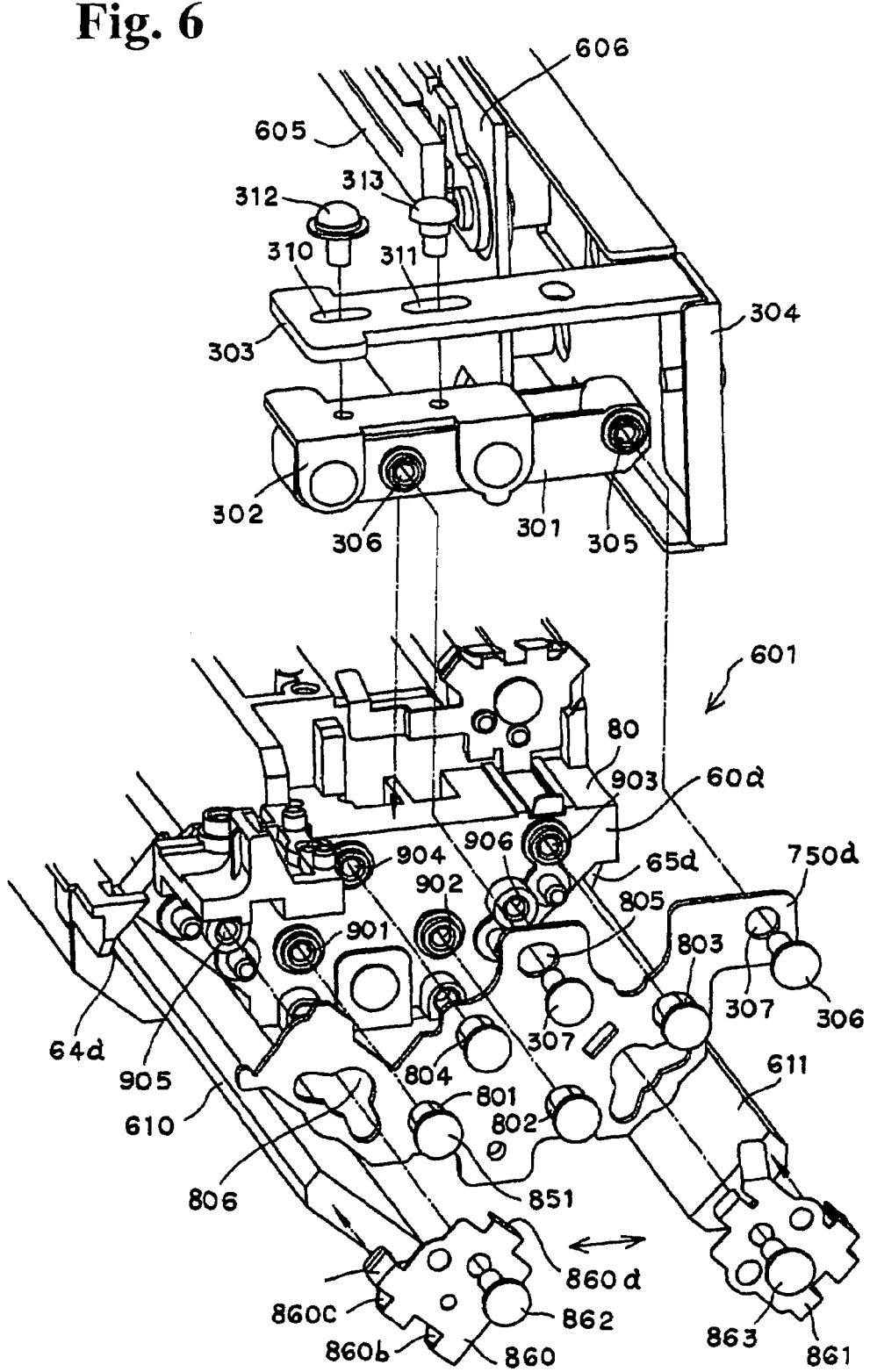
FIG. 6 is an exploded perspective view showing the image reading unit according to the embodiment in a state that leaf springs fix the first and second mirrors.
Figure 7:
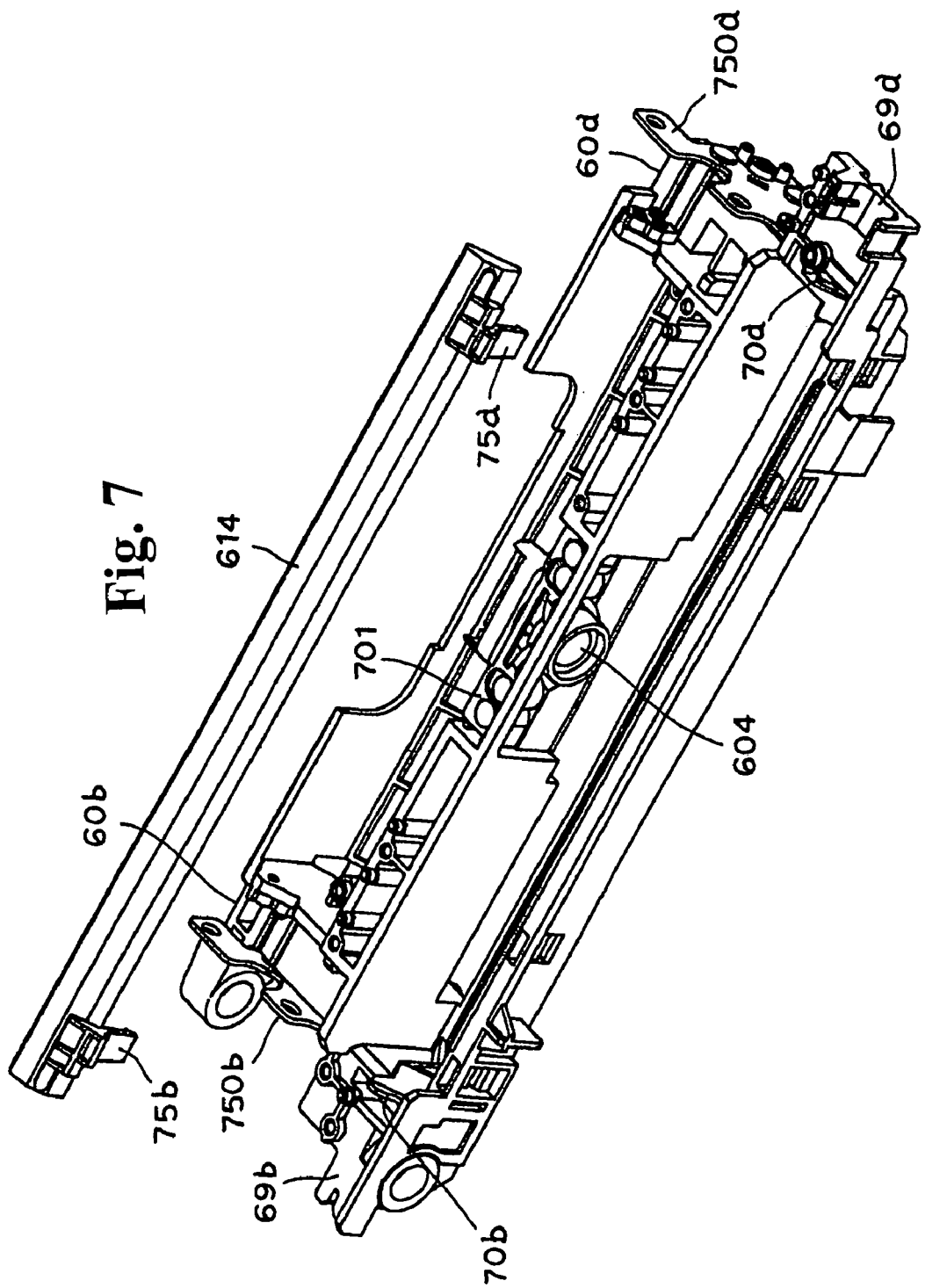
FIG. 7 is an exploded perspective view showing a frame and a fifth mirror in the image reading unit.

The image reading unit 6 includes first and second support plates 750a and 750b (see FIGS. 5(a), 5(b) and 7) made of metal and disposed outside the first and second sidewalls 60a and 60b as shown in FIG. 4. Further, the image reading unit 6 includes leaf springs 860 and 861 shown in FIG. 6 and leaf springs 75a and 75b shown in FIG. 7.

The opening of the upper part of the frame 601 is covered with a flat plate shaped cover 608 for blocking external light. At an end part of the cover 608 away from the xenon lamp 602 by a predetermined horizontal distance, a curved plate type reflector 607 is fixed along the xenon lamp 602f for enhancing the light to the original 609. A flexible cable 22 is drawn from a lower end part of a sensor board 606 fixed to the image sensor 605 and connected to the control panel 503.

The reflection mirror unit 603 includes a first mirror 610 disposed at a lower part of a light source for reflecting the light reflected from the original; a second mirror 611 horizontally away from the first mirror 610 and disposed with an angle for reflecting the reflected light from the first mirror 610 upwardly (toward the original); a third mirror 612 disposed with an angle above the second mirror 611 at the substantially same height as that of the xenon lamp 602 for reflecting the reflected light from the second mirror; a fourth mirror 613 disposed above the second mirror 611 and disposed with an angle near the third mirror 612 toward the xenon lamp 602 for reflecting the reflected light from the third mirror; and a fifth mirror 614 disposed between the first mirror and the light source for reflecting the reflected light through the first to fourth mirrors toward the lens unit. The first to fifth mirrors 610 to 614 are respectively chamfered at both corners of one surface (see FIGS. 5(a) and 5(b)).

As shown in FIG. 4, the frame 601 has third and fourth sidewalls 63 and 62 perpendicular to the first and second sidewalls 60a and 60b and opposed to each other. At lower parts of both ends of the first and second sidewalls 60a and 60b of the frame 601 in the sub-scanning direction, first to fourth openings 64a, 65a, 64b and 65b having the substantially same forms as those of the first and second mirrors 610 and 611 are formed (see FIGS. 5(a) and 5(b)), through which the first and second mirrors 610 and 611 respectively pass. On an outer side surface of the first sidewall 60a, dowels 901, 902, 903, 904, 905 and 906 of protrusions having circular sections and thread grooves formed therein are integrally formed (see FIG. 6 and FIG. 8) for fixing the first support plate 750a spaced by a predetermined distance. In the second sidewall 60b, dowels (not shown) are formed integrally.

On upper parts of the first and second sidewalls 60a and 60b at the third sidewall 63 side (left side in FIG. 4), lamp fixing parts 69a and 69b respectively protruding toward the outer sides of the first and second sidewalls 60a and 60b in the main scanning direction (a direction shown by an arrow mark) are formed integrally with the frame 601. In the inner surface side of the upper end of the fourth sidewall 62 of the first and second sidewalls 60a and 60b, mountain shaped support parts for supporting the third and fourth mirrors 612 and 613 are integrally formed. At the substantially central part of the fourth sidewall 62 in the main scanning direction, a substantially U-shaped opening is formed for retaining the image sensor 605.

A resin material of the frame 601 includes, for instance, polyphenylene oxide (PPO), PPE (modified PPO), and a resin material with a high strength and a low thermal expansion, i.e. PPO containing about 50% of glass fiber and having a coefficient of linear thermal expansion of about $31 \times 10^{-6}$ (/° C.). Further, in order to prevent an irregular reflection at the frame 601, a black pigment such as carbon is mixed with the resin material to make the frame 601 black.

As shown in FIG. 4, the third and fourth mirrors 612 and 613 are provided with an angle along mountain shapes of the mountain shaped-support parts. On the outer sides of both the end parts of the third and fourth mirrors 612 and 613, metallic leaf springs 68a and 68b having four claws are provided. The upper surfaces of the third and fourth mirrors 612 and 613 are urged toward the mountain shaped support parts from above by the four claws of the leaf springs 68a and 68b. Thus, the third and fourth mirrors 612 and 613 are fixed to the frame 601. To the lamp fixing parts 69a and 69b, square shaped fixing parts 67a and 67b are fitted for accommodating the end parts of the xenon lamp 602. As the xenon lamp 602, a fluorescent lamp filled with xenon gas is used. Inside the xenon lamp 602, a pair of electrodes is disposed along the main scanning direction. High voltage is applied between the electrodes to emit fluorescent light.

As shown in FIGS. 5(a), 5(b) and 6, in the first support plate 750a, hole parts 801 to 806 and 815 and 816 corresponding to the positions of the dowels 901 to 906, 305 and 306 are formed with a press machine.

Figure 8:
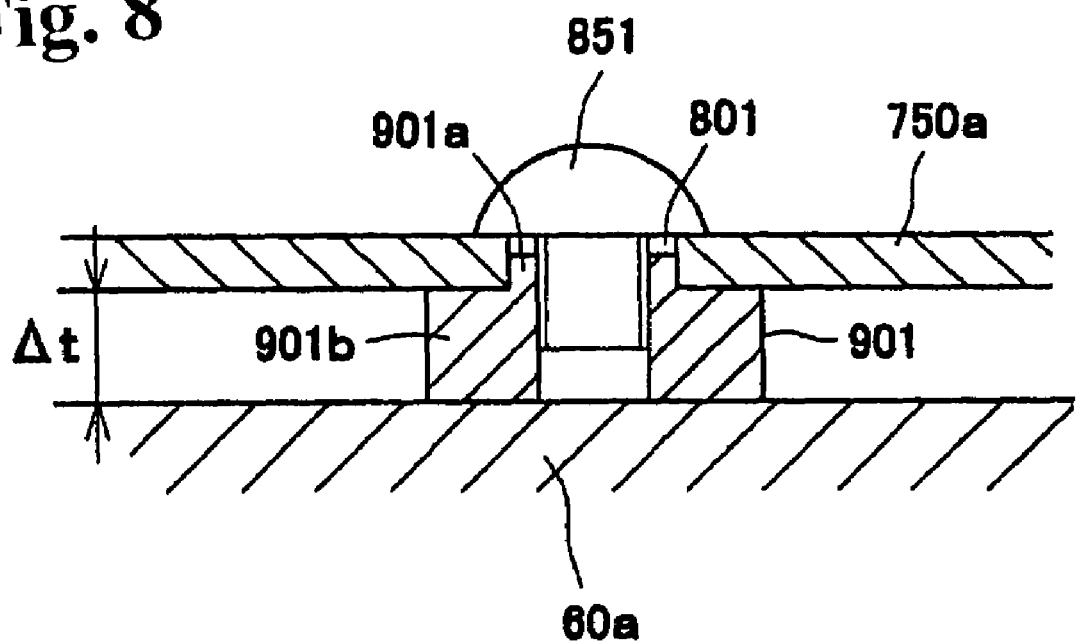
FIG. 8 is a sectional view showing a boss of a first sidewall of the image reading unit.

As shown in FIG. 8, the dowel 901 includes an annular dowel base part 901b protruding from the first sidewall 60a by a predetermined length Δt at a base thereof, and an annular dowel end part 901a with a reduced diameter at an end thereof. The first support plate 750a allows the dowel end part 901a to fit into the hole part 801 for positioning in the direction of an optical axis (arrow direction in FIG. 6) and the vertical direction. Then, a screw 851 is fastened to fix the first support plate 750a on the first sidewall 60a of the frame 601. The first support plate 750a is held between the upper surface of the dowel base part 901b and the bottom surface of the head of the screw 851. Thus, the first support plate 750a is spaced from the first sidewall 60a by the predetermined length Δt. That is, a clearance corresponding to the predetermined length Δt of the dowel base part 901b is formed between the first support plate 750a and the first sidewall 60a.

The dowels 902, 903 and 904 also include annular dowel parts 901b protruding from the first sidewall 60a by a predetermined length Δt at bases thereof and annular dowel end parts 901a having reduced diameters at ends thereof, similar to the dowel 901. Accordingly, in the dowels 902, 903 and 904 respectively, the clearances of Δt are formed between the first support plate and the first sidewall. The hole parts 802 to 804 are slots extending in a direction of an optical axis. The ends of the dowels 902 to 904 can respectively slide in the sub-scanning direction along the hole parts. The second support plate 750b side is also fixed to the second sidewall 60b by forming a clearance between the second sidewall 60b and the second support plate 750b.

Further, as shown in FIGS. 5(a) and 5(b), on the end face of the first support plate 750a near the first mirror 610 side, a flat semicircular protrusion 76a protrudes and abuts against the first mirror 601 (see FIG. 5(a)). On the end face of the second support plate 750b near the first mirror 610, a pair of flat semicircular protrusions 76b and 76c protrudes and abuts against the first mirror 610 (see FIG. 5(b)). On the end face of the first support plate 750a near the second mirror 611, a flat semicircular protrusion 77a protrudes and abuts against the second mirror 611. On the end face of the second support plate 750b near the second mirror 611, a pair of flat semicircular protrusions 77b and 77c protrudes and abuts against the second mirror 611. On the end face of the first support plate 750a near the fifth mirror 614, a flat semicircular protrusion 78a protrudes and abuts against the fifth mirror 614 (see FIG. 5(a)) On the end face of the second support plate 750b near the fifth mirror 614, a pair of flat semicircular protrusions 78b and 78c protrudes and abuts against the fifth mirror 614 (see FIG. 5(b)).

A material of the first and second support plates 750a and 750b includes an ordinary steel plate having a coefficient of linear thermal expansion of about $11.6 \times 10^{-6}$ (/° C.). Accordingly, the coefficient of linear thermal expansion of the material (resin) of the frame 601 is about 2.7 times greater than that of the first and second support plates 750a and 750b (steel plate). Thus, the support plates made of the material lower in coefficient of expansion/contraction support the mirrors, so that the change of the fixed positions of the mirrors can be more reduced.

As shown in FIG. 6, the leaf spring 860 disposed outside the first support plate 750a near the first mirror 610 side includes a claw 860a engaging the end face of the first support plate 750a, and claws 860b, 860c and 860d respectively engaging the end faces of the first mirror 610. Thus, in the first mirror 610, the end part thereof in the main scanning direction is urged toward the first support plate 750a side to be fixed and supported by the leaf spring 860. The end part of the second mirror 611 in the main scanning direction is urged toward the first support plate 750a side to be fixed and supported by the leaf spring 861 having claws like the first mirror 610. The end parts of the second support plate 750b side (not shown) are respectively fixed and supported by the second support plate 750b in the same manner as described above. Thus, in the first and second mirrors 610 and 611, both end parts in the main scanning direction respectively abut against and are supported by the first and second support plates 750a and 750b at the three points of the protrusions 76a to 76c and 77a to 77c.

The protrusions 76a to 76c abut against the first mirror 610 inside the first and third openings 64a and 64b. Accordingly, the first mirror 610 does not come into contact with the frame 601 and is supported by the first and second support plates 750a and 750b. Consequently, an influence from the frame 601 such as the expansion of the frame 601 may be reduced. Further, the protrusions 77a to 77c abut against the second mirror 611 inside the second and fourth openings 65a and 65b. Therefore, the second mirror 611 does not come into contact with the frame 601 and is supported by the first and second support plates 750a and 750b like the first mirror 610. The influence of the frame 601 may be decreased.

As shown in FIG. 7, the fifth mirror 614 is inserted into the frame 601 from above. The image reading unit 6 includes the leaf springs 75a and 75b having claws extended vertically and downwardly. While the upper surfaces of the ends of the fifth mirror 614 in the longitudinal direction abut against the lower surfaces of the leaf springs, the claws are fitted into fitting holes formed at the end parts of the third sidewall 63 of the frame 601. In such a manner, the fifth mirror 614 is urged to the flat semicircular protrusions 78a, 78b and 78c protruding on the first and second support plates 750a and 750b by the leaf springs 75a and 75b, and fixed and supported thereby (see FIGS. 5(a) and 5(b)). As shown in FIGS. 5(a) and 5(b), the end parts of the first and second support plates 750a and 750b near the protrusions 78a and 78b (dotted line parts shown in FIG. 5) protrude in the frame 610.

As shown in FIG. 3, the fifth mirror 614 is fixed to a part near the lower part of the light source. The light source is the fluorescent lamp filled with xenon gas. In the lamp, a pair of electrodes opposed to each other along the main scanning direction (the longitudinal direction) is formed. The high voltage is applied between the electrodes to emit the fluorescent light. Accordingly, when a metallic member exists in the vicinity of the light source, a discharge is generated between the metallic member and the electrodes. In this embodiment, the leaf springs for fixing the fifth mirror 614 are made of a resin to prevent the discharge.

Further, the lens unit 604 comprises a plurality of image forming lenses (for instance, six lenses) having a converging and correcting function and a lens barrel for holding these lenses, and the lens unit is housed in the frame 601. A groove is formed in the outer peripheral surface of the lens barrel. On the upper part of the lens barrel, a leaf spring 701 having a slot and a pair of claws engaging the groove is fastened and fixed to the frame 601 by screws. The claws urge the lens barrel from above. While the claws of the leaf spring 701 engage the groove, the leaf spring 701 is moved in the sub-scanning direction (direction of an optical axis) along the slot of the leaf spring 701. Thus, the position of the lens unit in the direction of the optical axis can be adjusted. When the image reading unit 6 is assembled, the lens unit 604 and the image sensor 605 are respectively adjusted and fixed at positions where the image of the original is accurately read by the image sensor 605 with a predetermined magnification.

As shown in FIG. 6, on the upper end face 80 of the first sidewall 60a, a rectangular rod shaped heat compensating member 301 made of a resin is mounted for absorbing a thermal expansion. As a material of the heat compensating member 301, a synthetic resin such as PPO having a coefficient of thermal expansion of about $70 \times 10^{-6}$ (/° C.) is employed. On the side surface of the heat compensating member 301, dowels 305 and 306 having thread grooves formed therein are integrally formed at positions corresponding to hole parts 815 and 816 of the first support plate 750a. The dowels 305 and 306 have a circular section like the dowel 901 of the first sidewall 60a. The heat compensating member 301 is positioned by fitting the end part of the dowel 305 to the hole part 815, fastened by a screw 306 and fixed to the first support plate 750a. The hole part 816 of the first support plate is a slot extending in the sub-scanning direction (arrow direction in FIG. 6).

The dowel 306 is fitted to the hole part only in the longitudinal direction thereof so that the dowel 306 can slide in the sub-scanning direction. The first support plate 750a is held between the upper surfaces of the base parts of the dowels 305 and 306 and the bottom surfaces of the heads of the screws 306 and 307. A predetermined clearance corresponding to the height of the dowels is formed between the heat compensating member 301 and the first support plate 750a. Thus, the heat compensating member 301 is fixed to the first support plate 750a. On the upper surface of the heat compensating member 301, an arm 303 made of a metallic steel plate having slots 310 and 311 extending in the sub-scanning direction is disposed through a metallic plate 302.

As a material of the arm 303, a steel plate having a coefficient of thermal expansion of about $11 \times 10^{-6}$ (/° C.) is employed. Accordingly, the coefficients of linear thermal expansion of the respective members have such a relation that the heat compensating member 301>the frame 601>the first and second support plates 750a and 750b=the arm 303. The arm 303 is fastened to the upper surface of the heat compensating member 301 by screws 312 and 313 through the plate 302. The arm 303 has a bent part bending substantially vertically and downwardly. On the bent part, a plate type support member 304 is fixed for supporting the sensor board 606. To the support member 304, the sensor board 606 is fastened by a screw. Further, on the sensor board 606, the image sensor 605 is fixed. Accordingly, the screws 312 and 313 are unfastened to slide the arm 303 along the slots 310 and 311, and then, fastened by the screws, so that the position of the image sensor 605 can be adjusted to the image forming position of the lens unit 604.

Figure 9:
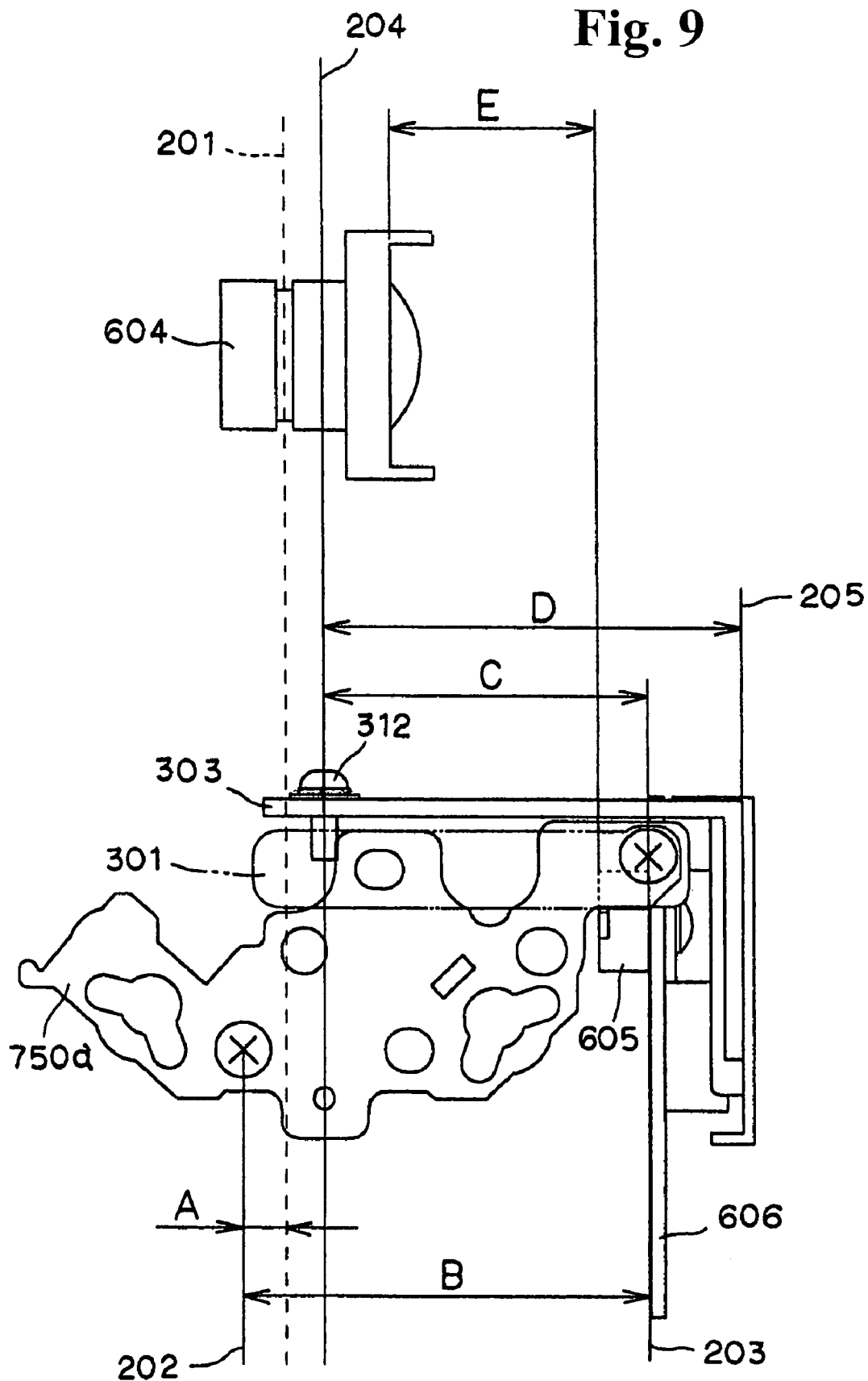
FIG. 9 is a side view showing the first support plate, a lens unit, an image sensor and an arm at an ordinary temperature.

As shown in FIG. 9, a distance from the fixed position 201 of the frame 601 and the lens unit 604 to the fixed position (a central line of the dowel 901 and the screw 851) 202 of the frame 601 and the first support plate 750a is set to be A (mm). A distance from the fixed position 202 to the fixed position (a central line of the dowel 305 and the screw 306) 203 of the first support plate 750a and the heat compensating member 301 is set to be B (mm). A distance from the fixed position 203 to the fixed position (central line of the screw 312) 204 of the heat compensating member 301 and the arm 303 is set to be C (mm). A distance from the fixed position 204 to the inner side surface 205 of the support member 304 is set to be D (mm).

The image sensor 605 is fixed at an image forming position where the lens unit 604 focuses at the temperature of 20° C. An image forming distance between the rear end part of the lens unit 604 and the front surface of the image sensor 605 is set to be E (mm). In this embodiment, the distance A is set to be about 4.94 mm, the distance B is set to be about 46.2 mm, the distance C is set to be about 40.5 mm, and the distance D is set to be about 51 mm.

When the atmospheric temperature rises by $\Delta T$ (° C.) from the ordinary temperature, it is arranged such that the image forming distance E of the lens unit 604 E' changes by $\Delta e$ to become due to the thermal expansion of the frame 601, the first and second support plates 750a and 750b, the heat compensating member 301, and the arm 303. The variation $\Delta e$ is a shift of the focus position of the lens unit 604 when the atmospheric temperature changes by $\Delta T$ (° C.). The variation $\Delta e$ is calculated in accordance with the following equation.

$$\Delta e = (-A(\text{mm}) \times 31 \times 10^{-6} (/° C.) \times \Delta T(° C.)) + (B(\text{mm}) \times 11.6 \times 10^{-6} (/° C.) \times \Delta T(° C.)) + (-C(\text{mm}) \times 70 \times 10^{-6} (/° C.) \times \Delta T(° C.)) + (D(\text{mm}) \times 11.6 \times 10^{-6} (/° C.) \times \Delta T(° C.))$$

The term '$A \times 31 \times 10^{-6} \times \Delta T$' is an amount of movement (expansion) of the fixed position 202 relative to the fixed position 201 toward the xenon lamp 602 due to the thermal expansion of the frame 601. The expanding direction of each member toward the xenon lamp 602 is regarded to be minus (−). The expanding direction of each member toward the image sensor 605 is regarded to be plus (+). For instance, when the temperature rises by 20° C., the change $\Delta e$ of the image forming distance is about −0.037 mm (shorter than that at the ordinary temperature of 20° C.).

Figure 10:
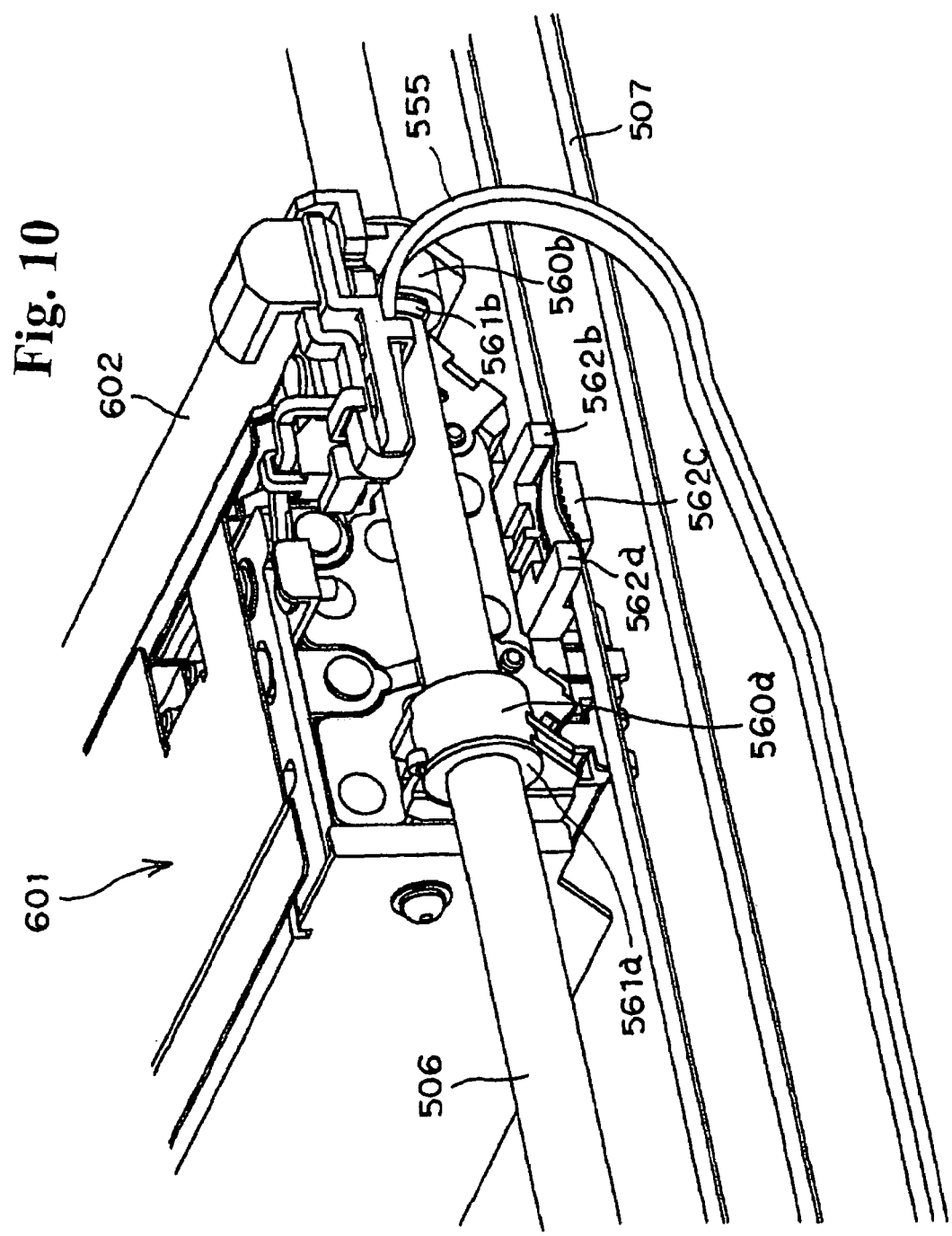
FIG. 10 is a perspective view showing the image reading unit supported on a shaft.

As shown in FIG. 10, on the second sidewall 60b of the image reading unit 6, a second support part 560b protruding in the main scanning direction at the lower side of the xenon lamp 602 and a first support part 560a protruding in the main scanning direction at a side opposite to the second support part 560b are integrally formed of a resin. In the first and second support parts 560a and 560b, holes having a circular section are formed for passing the shaft 506. Into the holes, cylindrical fitting members 561a and 561b made of a synthetic resin and having flange parts are respectively inserted. The inner peripheral surfaces of the fitting members 561a and 561b contact the outer peripheral surface of the shaft 506. One side of the image reading unit 6 in the main scanning direction is supported by the shaft 506.

Between the first and second support parts 560a and 560b of the second sidewall 60b at the lower part thereof, an engaging part is formed integrally with the frame 601 for engaging the driving unit 520. The engaging part includes first and second rod shaped engaging parts 562a and 562b having a rectangular section and protruding in the main scanning direction and a third plate shaped engaging part 562c disposed and opposed between the first and second engaging parts 562a and 562b and having a plurality of protrusions and recessed parts formed on an upper surface (see FIG. 5(b)). A timing belt 507 is held and engages between the first, second and third engaging parts 562a, 562b and 562c, so that the drive of a motor PM1 is transmitted to the image reading unit 6 to move the image reading unit in the sub-scanning direction.

Figure 11:
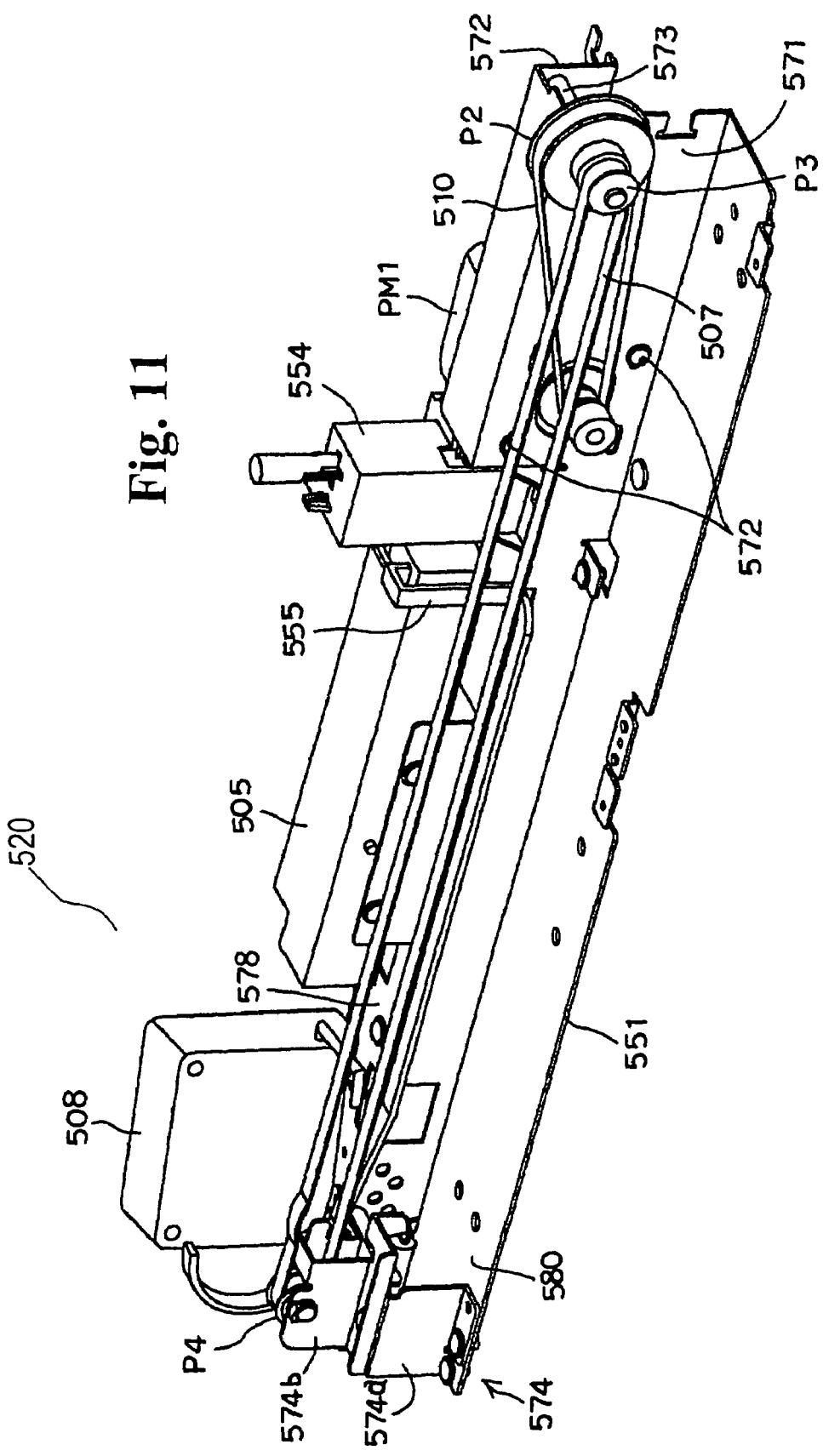
FIG. 11 is a perspective view showing a driving unit of the image reading apparatus according to the embodiment.

As shown in FIGS. 2 and 11, the driving unit 520 in the image reading part 1 includes a second reinforcing plate 551 made of an ordinary steel plate and disposed on the inner bottom surface of the lower casing 501a along the sub-scanning direction for reinforcing the lower casing 501a. The second reinforcing plate 551 is provided as a unit with a fan 508 at one end side of the sub-scanning direction and the home position side of the image reading unit 6; a motor PM1 at the other side of the sub-scanning direction and the end of the image reading unit 6; an inverter unit 505 disposed between the motor RM1 and the fan 508 and a drive transmitting part 519 for transmitting a power from the motor PM1 to the image reading unit 6. The drive transmitting part 519 includes a timing belt 510, a pulley P2, a pulley P3, the timing belt 507 and a pulley P4. The fan 508 supplies air to the second support plate 750b of the image reading unit 6. The motor PM1 serves as a power source for moving the image reading unit 6 in the sub-scanning direction. Further, on the second reinforcing plate 551, a ground line is attached for discharging static electricity through the control panel 503.

Figure 12:
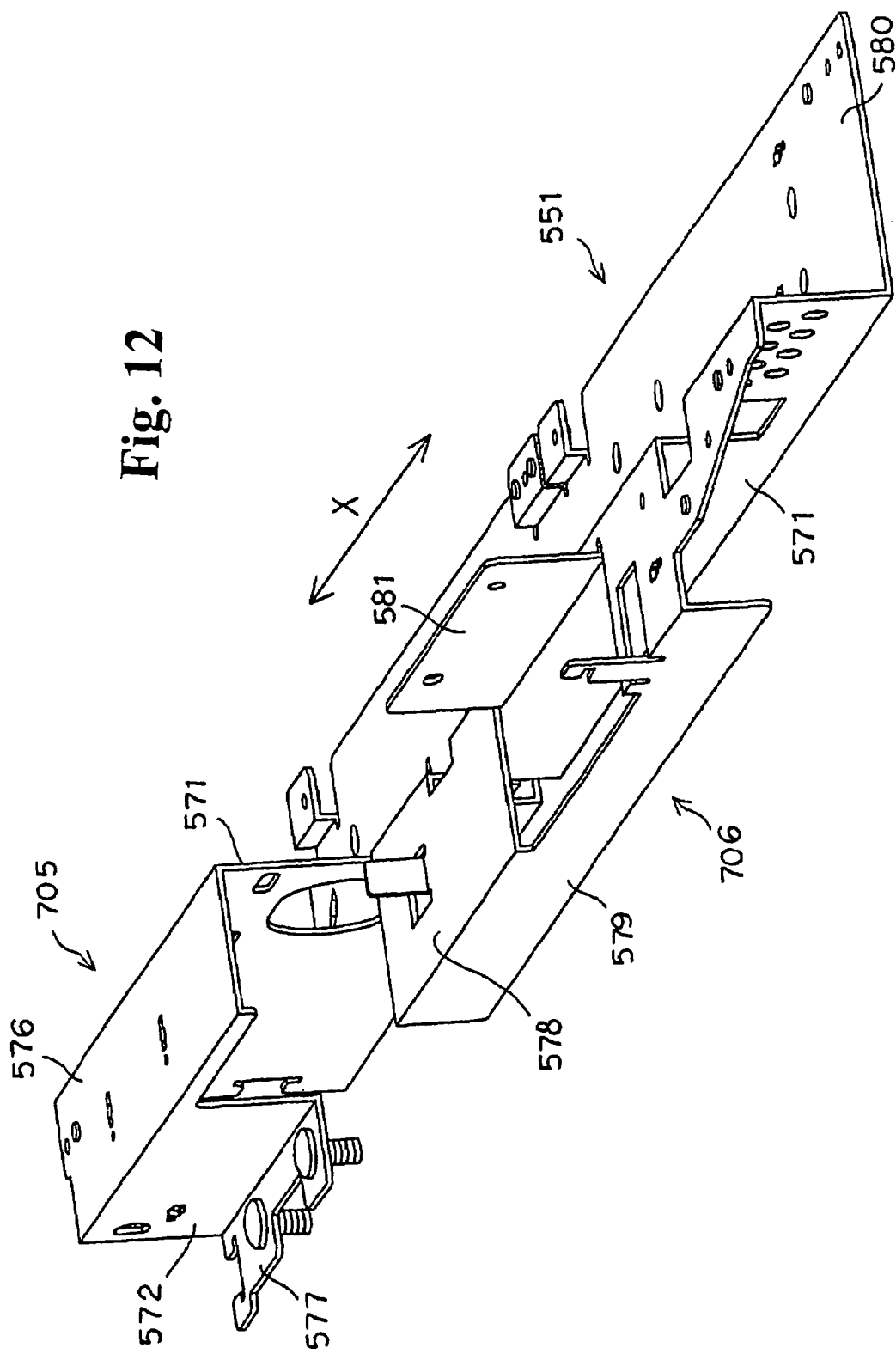
FIG. 12 is a perspective view of a second reinforcing plate of the image reading apparatus.

As shown in FIG. 12, the second reinforcing plate 551 has a bottom surface part 580 disposed on the inner bottom surface of the lower casing 501a along the sub-scanning direction and first and second support parts 705 and 706 having a U shape section and arranged along the bottom surface part 580. The first support part 705 is vertically higher than the second support part 706 and set to be short in the sub-scanning direction. The first support part 705 includes a bent part 571 substantially perpendicular to the bottom surface part 580; a horizontal plate 576 perpendicular to the bent part 571 and substantially parallel to the bottom surface part 580; a vertical plate 572 opposite and substantially parallel to the bent part 571; and a fixing part 577 having screw holes for fixing the plate to the lower casing 501a.

The first support part 705 has a U shape section formed of the bent part 571, the horizontal plate 576 and the vertical plate 572. The second support part 706 includes a bent part 571, a horizontal plate 578 perpendicular to the bent part 571 and substantially parallel to the bottom surface part 580, and a vertical plate 579 opposite and substantially parallel to the bent part 571. The second support part 706 has a U shape section formed of the bent part 571, the horizontal plate 578 and the vertical plate 579. On the horizontal plate 578, a rectangular heat radiating member 581 cut and bent in substantially parallel to the bent part 571 is formed and protrudes at the substantially central position of the second support part 706 in the sub-scanning direction.

As shown in FIGS. 11 and 12, the motor PM1 is fixed to the bent part 572 of the first support part 705 with two screws 575. The rotating shaft P1 of the motor PM1 protrudes from a substantially circular hole formed in the bent part 571 of the first support part 705. Further, the drive transmitting part 519 has the pulley P2 and the pulley P3 supported in the upper end part of the first support part 705 in the sub-scanning direction. The pulley P2 and the pulley P3 are fitted to a rotating shaft 573 supported by the bent part 571 and the vertical plate 572 so as to freely rotate. The drive transmitting part 519 has a fixing member 574 made of steel and disposed at an end part of the bottom surface part 580 opposite to the pulley P2 and the pulley P3.

The fixing member 574 includes a fixing base 574a with a substantially L-shape section fixed to the bottom surface part 580 with screws and a pulley supporting and adjusting member 574b fixed to the fixing base 574a with a screw for supporting the pulley P4 to freely rotate. On a bottom surface of the pulley supporting and adjusting member 574b, a slot extending in the sub-scanning direction is formed. Accordingly, the screw is unfastened to move the pulley supporting and adjusting member 574b along the slot, so that the position of the pulley supporting and adjusting member can be adjusted in the sub-scanning direction.

The drive transmitting part 519 has the timing belt 507 extending between the pair of pulleys P3 and P4. A distance between the pulley P3 and the pulley P4 and the tension of the timing belt 507 can be adjusted by moving the pulley supporting and adjusting member 574b in the sub-scanning direction. The other part of the timing belt 510 on the rotating shaft P1 is wound on the pulley P2. Thus, the driving force of the motor PM1 is transmitted to the image reading unit 6 through the rotating shaft P1, the timing belt 510, the pulley P2, the pulley P3 and the timing belt 507.

On the horizontal plate 578 of the second support part 706 near the motor PM1, a DF open sensor 554 is mounted and fastened with a screw for detecting the opening or closing state of the automatic original transporting part 2. At a position on the upper surface of the horizontal plate 578 and adjacent to the DF open sensor 554, the inverter unit 505 is disposed and connected to one end of a leading-out wire 555 for supplying electric power to the xenon lamp 602. The inverter unit 505 converts DC power to AC power and supplies high voltage to the xenon lamp 602. The inverter unit 505 is fixed to the heat radiating member 581 through a heat radiating plate (not shown). The inverter unit 505 is arranged at the substantially central part of the second reinforcing plate 551. At a position adjacent to the inverter unit 505, the fan 508 is opposed to the image reading unit 6. The fan 508, the inverter unit 505, the DF open sensor 554, the motor PM1 and the drive transmitting part 519 are disposed outside the scanning area of the image reading unit 6. That is, the above-described parts are respectively disposed and are not vertically overlapped on the image reading unit 6 inside the scanning area of the image reading unit 6.

As shown in FIG. 13, the first reinforcing plate 502 is made of one steel plate for reinforcing the lower casing 501a. The first reinforcing plate 502 has a slide surface 700 abutting against the slide member made of a synthetic resin fixed to the bottom surface of the image reading unit 6 for guiding the image reading unit 6 in the sub-scanning direction. That is, the first reinforcing plate 502 also serves as a guide member. Both end parts of the slide surface 700 in the main scanning direction include a first bent surface 703 and a second bent surface 702 respectively bent upwardly and downwardly to opposite sides relative to the slide surface 700 and extending along the sub-scanning direction. The first bent surface 703 is bent upwardly at an angle of 155 degrees relative to the slide surface 700. The second bent surface 702 is bent downward at an angle of 155 degrees relative to the slide surface 700.

The control part includes the control panel 503 for controlling the drive of the image sensor 605 or processing image data transferred from the image reading unit 6 through a flexible cable. The control panel 503 includes a CPU block. The CPU block comprises a CPU operating as a central processing unit, a ROM for storing the control operation of the image reading apparatus 10, a RAM serving as a work area of the CPU, and an internal bus for connecting them. An external bus is connected to the CPU block. The external bus is connected to a driver control unit for controlling a motor driver for transmitting drive pulses to motors, a fan control unit for controlling the fan 508, and an external interface for outputting the image data read by the image reading unit 6 to a high order machine such as a personal computer. The driver control unit is connected to the driver for driving the motors PM1 to PM3, and the fan control unit is connected to the fan 508, respectively.

The automatic original transporting part (hereinafter referred to as an ADF) 2 is attached to the image reading part 1 by a hinge mechanism so as to freely open and close. The ADF 2 includes a sheet feed tray 11 for mounting a plurality of originals; an empty sensor 91 disposed at the substantially central part of the sheet feed tray 11 for detecting the originals mounted on the sheet feed tray 11; a transporting part 37 for transporting the originals mounted on the sheet feed tray 11 to a reading position X; a sheet delivery tray 12 disposed below the sheet feed tray 11 for accommodating the originals; and motors PM2 and PM3 for driving the transporting part 37.

The transporting part 37 includes a pick-up roller 30 for supplying the originals mounted on the sheet feed tray 11; a sheet feed roller 31 for separating the originals supplied by the pick-up roller 30 one by one and feeding the originals; and transporting rollers 32, 33, 34 and 36 for transporting and delivering the originals.

The sheet feed roller 31, the pick-up roller 30 and the transporting roller 32 can be driven and rotated by driving the motor PM2 through a well-known drive transmitting mechanism such as a gear or a pulley. The transporting rollers 33, 34 and 36 can be rotated and driven by the motor PM3 through a well-known drive transmitting mechanism such as a gear or a pulley.

The image reading apparatus 10 is connected to an image forming apparatus such as a copy machine or a printer. Thus, the image reading apparatus can read an image in two modes, i.e. a moving original reading mode of scanning a moving original transported by the ADF 2 and a fixed original reading mode in which the image reading unit 6 moves in the sub-scanning direction to scan a stationary original mounted on the platen 511.

Both in the moving and fixed original reading modes, the light emitted from the xenon lamp 602 is reflected by the original 609, and further reflected by the first, second, third, fourth, second, first and fifth mirrors in this order. The light reflected by the fifth mirror 614 forms an image at the lens unit 604 and is incident on the image sensor 605. An analog signal is converted into an electric signal in the image sensor 605, and is processed for an A/D conversion and a gain adjustment. Then, the digital signal is transferred to the control panel 503 through the flexible cable 22. In the control panel 503, various image processes such as a shading correction are performed, and then, image data is transferred to an external apparatus such as a personal computer through an external interface.

In the fixed original reading mode, while the image reading unit 6 is moved in the sub-scanning direction (right side in FIG. 1) from the home position (standing-by position) H, the mounted stationary original is read with a reference position Y as a reference. In the moving original reading mode, the image reading unit 6 is fixed at the reading position X and reads the originals transported to the reading position X by the ADF 2. That is, the originals mounted on the sheet feed tray 11 are transported to the reading position X at a predetermined speed by the rotation of the pick-up roller 30, the separation roller 31, and the transporting rollers 32, 33, 34 and 36 driven by the motors PM2 and PM3, respectively. The image reading unit 6 fixed at the reading position X reads the images. The originals are delivered to the sheet delivery tray 12 after the images are completely read. The originals are continuously transported to perform a continuous reading operation until the empty sensor 91 does not detect the originals on the sheet feed tray 11.

Effects of the image reading apparatus 10 according to the embodiment of the present invention will be described below. In the image reading apparatus 10, the motor PM1, the inverter unit 505, the fan 508 and the drive transmitting part 519 are fixed to the second reinforcing plate 551 made of metal to form a driving unit. Therefore, a ground line may be provided only in the second reinforcing plate 551. The ground line does not need to be respectively attached to the parts. Thus, the number of parts can be reduced. Further, in the image reading apparatus 10, the parts can be respectively attached to the lower casing 501a integrally together with the second reinforcing plate 551. Accordingly, the parts do not need to be respectively attached to the lower casing 501a to improve assembly characteristics.

Further, the motor PM1 is fixed to the second reinforcing plate 551 separate from the shaft 506 and the first reinforcing plate 502 for supporting the image reading unit 6. Therefore, since the vibration of the motor PM1 is not transmitted to the image reading unit 6, the image reading apparatus 10 can be performing an accurate scanning operation.

In the image reading apparatus 10 of the embodiment, the timing belt 507 engages the engaging part of the image reading unit 6. The drive transmitting part 519 includes the timing belt 507, the pulleys P2, P3 and P4, and the pulley supporting and adjusting member 574b for adjusting the distance between the pulleys P3 and P4. Accordingly, before the driving unit 520 is attached to the lower casing 501a, the tension of the timing belt 507 can be adjusted by the pulley supporting and adjusting member 574b. Thus, the assembly characteristics can be improved.

Further, in the image reading apparatus 10 of the embodiment, the casing 501 is made of a resin material and the first and second reinforcing plates 502 and 551 are made of a metallic material. Since the metallic material has strength higher than that of the resin material, the casing 501 is further reinforced by the first and second metallic reinforcing plates 502 and 551. The metallic material has a coefficient of thermal expansion lower than that of the resin material. Thus, the amount of expansion/contraction of the second reinforcing plate 551 due to the temperature change is lower than that of the casing 501. Therefore, the change of the distance between the pulleys P3 and P4 fixed to the second reinforcing plate 551 can be reduced to assure the stability in running of the image reading unit 6.

In the image reading apparatus 10 of the embodiment, the first and second reinforcing plates 502 and 551 are disposed on the inner bottom surface of the casing 501. Accordingly, the casing 501 can be reinforced not to deform in the sub-scanning direction, and the image reading unit 6 can be supported on the inner bottom surface of the casing 501 in a stable state through the first reinforcing plate 502.

In the image reading apparatus 10, the casing 501 has the first and second case sidewalls 550a and 550b. The end parts of the shaft 506 are respectively fixed to the first and second case sidewalls 550a and 550b, and the second reinforcing plate 551 is disposed in the vicinity of the shaft 506. Accordingly, the second reinforcing plate 551 is disposed near the shaft 506, so that a part of the casing 501 near the shaft 506 can be reinforced. Thus, the linearity of the shaft 506 can be maintained for the accurate reading and scanning operation.

Further, in the image reading apparatus 10 of the embodiment according to the present invention, the fan 508, the inverter unit 505, the motor PM1 and the drive transmitting part 519 are fixed to the second reinforcing plate 551 outside the scanning area of the image reading unit 6. Accordingly, since the image reading unit 6, the fan 508, the inverter unit 505, the motor PM1 and the drive transmitting part 519 are not vertically overlapped, the thickness of the image reading apparatus can be reduced.

In the image reading apparatus 10 of the embodiment, the motor PM1, the fan 508, and the inverter unit 505 are arranged in parallel along the sub-scanning direction. At one side of the sub-scanning direction, the fan 508 is disposed. At the other side, the motor PM1 is disposed. The inverter unit 505 is disposed between the fan 508 and the motor PM1. Accordingly, the inverter unit 505 is arranged at the substantially central part in the, sub-scanning direction of the casing 501. Thus, since the inverter unit 505 is disposed near the image reading unit 6, the leading-out wire 555 between the inverter unit 505 and the image reading unit 6 can be shortened to reduce a cost. A load generated on the image reading unit 6 due to the contact of the leading-out wire 555 with the platen 511 or the like can be reduced.

Further, in the image reading apparatus 10 of the embodiment according to the present invention, the first reinforcing plate 502 has the slide surface 700. In the end parts of the slide surface 700 along the sub-scanning direction, the bent surfaces 703 and 702 are formed. Accordingly, the first reinforcing plate 502 can be reinforced by the bent surfaces 703 and 702. Thus, the bending of the casing 501 in the arrow directions in FIG. 13 due to, for instance, a vertical force, can be suppressed. Further, since the first reinforcing plate 502 also serves as the member for guiding the image reading unit 6, the number of parts can be reduced.

In the image reading apparatus 10 of the embodiment according to the present invention, the second reinforcing member 551 includes the bottom surface part 580 along the inner bottom surface of the casing 501 and the bent part 571. Accordingly, since the second reinforcing plate 551 can be reinforced by the bent part 571, the bending of the casing 501 due to a vertical force can be suppressed.

In the image reading apparatus 10 of the embodiment according to the present invention, the first and second support parts 705 and 706 of the second reinforcing plate 551 have the substantially U shape section. Accordingly, since the second reinforcing plate 551 can be reinforced by the first and second support parts 705 and 706, the bending (in the arrow direction shown in FIG. 12) of the casing 501 due to the vertical force can be suppressed. The pulley P2 is supported by the first support part 705. Accordingly, since another member for supporting the pulley P2 at predetermined height is not necessary, the increase of the number of parts can be prevented.

Further, in the image reading apparatus 10 of the embodiment according to the present invention, the timing belt 507 is extended between the pulleys P3 and P4. Therefore, a force in the arrow direction in FIG. 12 is exerted on a lower frame. However, the deformation of the lower frame can be prevented by the second reinforcing plate 551. The second reinforcing plate 551 has the U shape section, so that the lower frame can be further reinforced.

In the image reading apparatus 10 of the embodiment according to the present invention, even when the image forming distance E of the lens unit 604 changes due to the temperature change, the screws 312 and 313 may be unfastened to slide the arm 303. Thus, the image sensor 605 can be adjusted to the right focusing position. Thus, a good image can be obtained.

Further, in the image reading apparatus 10 of the embodiment according to the present invention, the screw holes 801 to 804, 815 and 816 are respectively the slots. Accordingly, when the thermal expansion is generated, the first support plate 750a slides. Thus, the difference in thermal expansion between the first support plate 750a and the frame 601 is absorbed to suppress the shift of the respective mirrors.

In the image reading apparatus 10 of the embodiment according to the invention, the position of the leaf spring 701 can be adjusted by moving the leaf spring 701 in the sub-scanning (optical axis) direction along the slot of the leaf spring 701. Thus, the leaf spring 701 is moved in the direction of an optical axis so that the lens unit 604 can be adjusted and fixed to the predetermined focusing position.

Further, in the image reading apparatus 10 of the embodiment according to the present invention, the heat compensating member 301, the support plates, and the arm 303 are fixed to slide along the direction of an optical axis (sub-scanning direction). Further, the coefficients of thermal expansion and the fixed positions of the above-described members are respectively set in the predetermined relations. Thus, the thermal expansions of the above members due to the temperature change can be respectively absorbed, and the distance between the lens unit and the image sensor can be adequately held.

In the image reading apparatus 10 of the embodiment according to the present invention, the fan 508, the inverter unit 505, the DF open sensor 554 are respectively fixed on the horizontal plate 578 with the screws. The inverter unit 505 is fixed to the heat radiating member 581 formed of a bending part of the horizontal plate 578 through the heat radiating plate (not shown). Accordingly, the heat generated from the inverter unit 505 can be discharged from the radiating member 581.

In the image reading apparatus 10 of the embodiment according to the present invention, the first and second support plates 750a and 750b are disposed outside the first and second sidewalls 60a and 60b of the frame 601 for supporting the first mirror, the second mirror and the fifth mirror 610, 611 and 614. Accordingly, since the irregular reflection of the light generated at the plates can be reduced, a good image can be obtained. Further, since the heat is hardly confined outside the frame 601, the rise of temperature of the first and second support plates 750a and 750b is suppressed. Thus, the change of the positions of the first mirror, the second mirror and the fifth mirror 610, 611 and 614 due to the thermal expansion of the first and second plates 750a and 750b can be suppressed. Accordingly, the deviation of a focus due to the shift of the mirrors can be suppressed to obtain a satisfactory image.

Further, in the image reading apparatus 10 of the embodiment according to the present invention, the frame 601 is made of a resin and the first and second support plates 750a and 750b are made of a metal. Accordingly, since the first, second and fifth mirrors 610, 611 and 614 can be fixed to the metallic plates having the low coefficients of thermal expansion and the high strength, the change of the positions of the first, second and fifth mirrors 610, 611 and 614 can be reduced to obtain a good image.

In the image reading apparatus 10 of the embodiment according to the present invention, the first to fourth openings 64a, 64b, 65a and 65b are respectively formed on the first and second sidewalls 60a and 60b for retaining the first, second and fifth mirrors 610, 611 and 614. Accordingly, the first and second support plates 750a and 750b disposed outside the first and second sidewalls 60a and 60b can support the first, second and fifth mirrors 610, 611 and 614. Consequently, the heat transmitted to the first and second support plates 750a and 750b from the frame 601 can be reduced. Therefore, the deformation of the first and second support plates 750a and 750b can be suppressed and the shift of the positions of the first, second and fifth mirrors 610, 611 and 614 can be reduced.

In the image reading apparatus 10 of the embodiment according to the present invention, on the first support plate 750a, the semicircular protrusions 76a, 77a and 78a respectively protrude. On the second support plates 750b, semi-circular protrusions 76b, 76c, 77b, 77c, 78b and 78c respectively protrude. Thus, the first, second and fifth mirrors 610, 611 and 614 can be respectively supported at the three points. Accordingly, the first, second and fifth mirrors 610, 611 and 614 can be easily supported without generating torsional stress exerted on the first, second and fifth mirrors 610, 611 and 614 owing to dimensional accuracy of the first and second support plates 750a and 750b.

In the image reading apparatus 10 according to the present invention, on the first and second sidewalls 60a and 60b, a plurality of protrusions (dowels) is formed. Between the first and second support plates 750a and 750b, and the first and second sidewalls 60a and 60b, the clearances corresponding to the height of the base parts of the dowels are formed. Since the contact areas of the sidewall with the plates are more reduced, the rise of the temperature of the first and second support plates 750a and 750b can be more reduced. Accordingly, the thermal expansion of the first and second support plates 750a and 750b can be more suppressed. Thus, the shift of the positions of the mirrors can be respectively reduced.

Further, in the image reading apparatus according to the present invention, the fifth mirror 614 is disposed in the vicinity of the lower part of the xenon lamp 602. The leaf springs 75a and 75b for urging the fifth mirror 614 to the first and second support plates 750a and 750b are made of a synthetic resin. Therefore, since leaf springs made of metal are not disposed in the vicinity of the electrodes of the xenon lamp 602, the generation of a discharge can be prevented between the leaf springs 75a and 75b and the electrodes of the xenon lamp 602.

In the image reading apparatus 10 of the embodiment according to the present invention, the image reading unit 6 is accommodated in the casing 501, and the fan 508 is accommodated in the casing 501. Thus, the inside of the casing is cooled so that the rise of temperature of the first and second support plates 750a and 750b is prevented.

Further, in the image reading apparatus 10 of the embodiment according to the present invention, the image reading part 1 includes the ADF 2. The fan 508 is disposed at a position where the fan supplies air to the first and second support plates 750a and 750b. Accordingly, the original 609 can be transported to the predetermined reading position, and the air can be supplied to the first and second support plates 750a and 750b of the image reading unit 6 arranged at the predetermined reading position. When the originals 609 transported by the ADF 2 are continuously read, the lighting time of the xenon lamp is increased, and the temperature of the first and second support plates 750a and 750b increases. Even in this case, since the steel plate has high thermal conductivity, the first and second support plates 750a and 750b can be cooled by the fan 508 to suppress the rise of temperature and obtain a good image.

In the embodiment, three mirrors of the first, second and fifth mirrors 610, 611 and 614 of the total of five mirrors of the first to fifth mirrors 610 to 614 are supported by the first and second support plates 750a and 750b. The first and second support plates 750a and 750b may support the third and fourth mirrors 612 and 613. In such a way, since the shift of the positions of the third and fourth mirrors 612 and 613 due to the temperature change can be suppressed, a better image can be obtained.

Further, in the embodiment, the dowels 901 to 906 are formed integrally on the first and second sidewalls 60a and 60b of the frame 601. The dowels may be formed with separate members. In such a way, the first and second support plates 750a and 750b can be also separated from the first and second sidewalls 60a and 60b by the predetermined length Δt to suppress the thermal expansion.

Further, in the embodiment, in order to reduce the thickness of the image reading apparatus 10, the angles between the slide surface 700 of the first reinforcing plate 502 and the bent surfaces 702 and 703 are set to be 155 degrees. The angle may be substantially vertical to achieve a stronger reinforcement. The bending directions of both the bent surfaces 702 and 703 may be the same. The bent surface may be provided only in one end part.

Further, in the embodiment, the inner bottom surface of the lower casing 501a is flat. On the inner bottom surface of the lower casing, bent surfaces formed of a resin may be integrated along the bent surfaces 702 and 703 of the first reinforcing plate 502. Thus, the lower casing 501a can be more reinforced by the first reinforcing plate.

Further, in the embodiment, the second reinforcing plate 551 has the two first and second support parts 705 and 706. A support part continuously extending in the sub-scanning direction and having a substantially U-shape section may be provided. In such a way, the strength of the second reinforcing plate can be more increased.

In the embodiment, the timing belt 507 engages the first and third engaging parts 562a to 562c and the image reading unit 6. The structure of the engaging part is not limited thereto, and the timing belt 507 may be held by two plate shaped holding members protruding from the second sidewall 60b.

In the embodiment of the present invention, only the pulley P3 is fixed to the bent part 571. The pulley supporting and adjusting member 574b may be fixed to the bent part 571 so as to adjust a position thereof. Thus, the fixing base 574a for fixing the pulley P4 at a predetermined height is not necessary, so that the number of parts and cost can be reduced.

As described above, according to the present invention, the casing is made of a resin to reduce a weight of the apparatus. The driving source and the drive transmitting unit are fixed to the second reinforcing plate to form a driving unit. Thus, the driving source and the drive transmitting unit can be attached to the casing integrally with the second reinforcing plate by the small number of parts. Thus, the assembly characteristics can be improved. Since the driving source is fixed to the second reinforcing plate separate from the supporting unit for supporting the scanning unit and the first reinforcing plate, the vibration of the driving source can be suppressed from being transmitted to the scanning unit. Accordingly, the image reading apparatus is capable of performing an accurate scanning operation.

Further, the frame is made of a resin to reduce a weight of the units. The support plates for supporting the reflecting unit are disposed outside the pair of the sidewalls of the frame. Thus, the irregular reflection of the light generated at the support plates can be reduced. Since the heat is hardly confined outside the frame, the thermal expansion of the support plates due to the rise of temperature can be suppressed to suppress the change of the position of the reflecting unit. Accordingly, a good image can be obtained.

While the invention has been explained with the specific embodiments of the invention, the explanation is illustrative and the invention is limited only by the appended claims.

What is claimed is:

1. An image reading apparatus for reading an original, comprising:
    a casing,
    a scanning unit disposed in the casing and movable in a sub-scanning direction for reading the original,
    a supporting member attached to the casing for supporting the scanning unit at one side thereof in a main scanning direction and guiding the scanning unit in the sub-scanning direction,
    a driving source for moving the scanning unit in the sub-scanning direction,
    a drive transmitting unit for transmitting a drive force of the driving source to the scanning unit, and
    first and second reinforcing plates attached to the casing along the sub-scanning direction for reinforcing the casing, said first reinforcing plate having a guide unit for supporting the scanning unit at the other side thereof in the main scanning direction and for guiding the scanning unit in the sub-scanning direction, said driving source and the drive transmitting unit being fixed to the second reinforcing plate.

2. An image reading apparatus according to claim 1, wherein said drive transmitting unit engages the scanning unit, and includes an endless belt for transmitting the drive force of the driving source to the scanning unit, a pair of pulleys for supporting the endless belt, and an adjusting unit for adjusting a distance between the pair of the pulleys.

3. An image reading apparatus according to claim 2, wherein said second reinforcing plate includes a support part having a U-shape section and extending along the sub-scanning direction for supporting at least one of the pair of the pulleys.

4. An image reading apparatus according to claim 1, wherein said casing is made of a resin material, and said first and second reinforcing plates are made of a metallic material.

5. An image reading apparatus according to claim 1, wherein said first and second reinforcing plates are disposed on an inner bottom surface of the casing.

6. An image reading apparatus according to claim 1, wherein said casing has first and second sidewalls spaced apart in the sub-scanning direction, said supporting member having a rod-shape and being disposed adjacent to the second reinforcing plate along the sub-scanning direction, said supporting member having end portions fixed to the first and second sidewalls.

7. An image reading apparatus according to claim 1, further comprising a fan attached to the second reinforcing plate for cooling the casing and a light source driving unit attached to the second reinforcing plate for supplying power to a light source disposed in the scanning unit for irradiating the original.

8. An image reading apparatus according to claim 7, wherein said fan and the light source driving unit are attached to the second reinforcing plate outside an area where the scanning unit moves.

9. An image reading apparatus according to claim 8, wherein said fan is attached to the second reinforcing plate at one side thereof in the sub-scanning direction, said driving source being attached to the second reinforcing plate at the other side thereof in the sub-scanning direction, said light source driving unit being disposed between the fan and the driving source so that the driving source, the fan and the light source driving unit are aligned along the sub-scanning direction.

10. An image reading apparatus according to claim 1, wherein said first reinforcing plate includes a slide surface having two ends and extending along the sub-scanning direction for guiding the scanning unit, said slide surface having a curved surface curved relative to the slide surface on at least one of the two ends.

11. An image reading apparatus according to claim 1, wherein said second reinforcing plate has a bottom surface extending along an inner bottom surface of the casing and a curved surface curved relative to the bottom surface.

12. An image reading unit for reading an original, comprising:
a light source for irradiating the original,
a frame for supporting the light source, said frame having a pair of sidewalls spaced apart and opposed to each other in a longitudinal direction of the light source,
a reflecting unit disposed along the longitudinal direction of the light source for reflecting the light reflected from the original,
an image forming unit disposed adjacent to the reflecting unit for forming an image of the light reflected from the reflecting unit,
a photoelectric converting unit disposed adjacent to the image forming unit for converting the light of the image formed by the image forming unit into an electric signal,
a pair of support plates disposed outside the pair of the sidewalls of the frame for supporting the reflecting unit, and
a fixing unit for fixing end portions of the reflecting unit in a longitudinal direction thereof to the pair of the support plates.

13. An image reading unit according to claim 12, wherein said frame is made of a resin material and said support plates are made of a metallic material.

14. An image reading unit according to claim 12, wherein said pair of the sidewalls of the frame includes openings for receiving the reflecting unit.

15. An image reading unit according to claim 14, wherein said pair of the support plates supports the reflecting unit inside the openings.

16. An image reading unit according to claim 12, wherein one of said pair of the support plates includes at least a pair of protrusions abutting against the reflecting unit, and the other of the pair of the support plates includes at least one protrusion abutting against the reflecting unit.

17. An image reading unit according to claim 12, wherein said pair of the support plates is respectively fixed to the pair of the sidewalls of the frame through protrusions protruding from outer surfaces of the pair of the sidewalls of the frame so that gaps corresponding to a height of the protrusions are formed between the support plates and the sidewalls.

18. An image reading unit according to claim 12, wherein said reflecting unit includes a final reflection mirror disposed adjacent to the light source for guiding the light reflected from the original to the image forming unit, said fixing unit fixing the final reflecting mirror to the pair of the support plates and being made of a resin.

19. An image reading apparatus comprising the image reading unit according to claim 12, a casing for accommodating the image reading unit therein, and a fan disposed in the casing for cooling the casing.

20. An image reading apparatus according to claim 19, further comprising an original transporting unit for transporting the original to a predetermined reading position, said image reading unit being arranged at the predetermined reading position for reading the original transported by the original transporting unit, said fan being arranged at a position where the fan supplies air to the support plates of the image reading unit.

* * * * *